US008647126B2

(12) United States Patent
Ahl et al.

(10) Patent No.: US 8,647,126 B2
(45) Date of Patent: Feb. 11, 2014

(54) SYSTEM AND COMPUTER PROGRAM PRODUCT FOR DEVELOPING AND DELIVERING A TRAINING COURSE

(75) Inventors: William J. Ahl, Seattle, WA (US); Cameron J. Forrest, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1719 days.

(21) Appl. No.: 11/513,596

(22) Filed: Aug. 30, 2006

(65) Prior Publication Data

US 2013/0101978 A1    Apr. 25, 2013

(51) Int. Cl.
*G09B 25/00* (2006.01)
*G06F 3/00* (2006.01)

(52) U.S. Cl.
USPC ............ 434/365; 434/323; 715/731; 715/732

(58) Field of Classification Search
USPC ........... 434/323, 350, 322, 219; 715/730–732
See application file for complete search history.

(56) References Cited

U.S. PATENT DOCUMENTS

| | | | |
|---|---|---|---|
| 5,810,605 A | 9/1998 | Siefert | |
| 6,083,007 A * | 7/2000 | Joliat et al. | 434/262 |
| 6,149,441 A | 11/2000 | Pellegrino et al. | |
| 6,213,780 B1 * | 4/2001 | Ho et al. | 434/219 |
| 6,282,404 B1 | 8/2001 | Linton | |
| 6,371,765 B1 | 4/2002 | Wall et al. | |
| 6,404,441 B1 * | 6/2002 | Chailleux | 715/704 |
| 6,514,079 B1 * | 2/2003 | McMenimen et al. | 434/219 |
| 6,519,445 B2 | 2/2003 | Casey-Cholakis et al. | |
| 6,574,537 B2 | 6/2003 | Kipersztok et al. | |
| 6,601,057 B1 | 7/2003 | Underwood et al. | |
| 6,625,618 B1 | 9/2003 | Arai | |
| 6,721,713 B1 | 4/2004 | Guheen et al. | |
| 6,909,874 B2 | 6/2005 | Holtz et al. | |
| 7,058,891 B2 * | 6/2006 | O'Neal et al. | 715/730 |
| 7,069,261 B2 | 6/2006 | Ahl et al. | |
| 7,287,224 B2 * | 10/2007 | Beam, III | 715/709 |
| 7,526,726 B1 | 4/2009 | Skwarecki et al. | |

(Continued)

FOREIGN PATENT DOCUMENTS

WO    WO 2004029753    4/2004

OTHER PUBLICATIONS

CustomGuide, Inc., "Microsoft® PowerPoint 2003 User Edition Complete," Coast Community College District, Minneapolis, MN; (Copyright 2003), 279 pages.

(Continued)

*Primary Examiner* — Peter Egloff
(74) *Attorney, Agent, or Firm* — Toler Law Group, PC

(57) ABSTRACT

A first processing component is configured to create at least a first slide from electronic media selected from an electronic media repository. A computer communications interface is configured to access via a computer network a training electronic media repository. A first user interface is configured to permit selecting from the training electronic media repository a training course that includes at least a first slide including a presenter screen and further including at least a first presentee screen. A second processing component is configured to generate an image of the at least first slide for display by a first display subsystem. A third processing component is configured to generate an image of the at least first presentee screen for display by a second display subsystem to at least one presentee without displaying the presenter screen to the presentee.

32 Claims, 17 Drawing Sheets

(56) References Cited

U.S. PATENT DOCUMENTS

| | | |
|---|---|---|
| 2002/0133389 A1 | 9/2002 | Sinex |
| 2002/0188583 A1* | 12/2002 | Rukavina et al. ............... 706/45 |
| 2003/0126136 A1 | 7/2003 | Omoigui |
| 2003/0160814 A1 | 8/2003 | Brown |
| 2003/0163784 A1 | 8/2003 | Daniel et al. |
| 2003/0187823 A1 | 10/2003 | Ahl et al. |
| 2004/0001106 A1 | 1/2004 | Deutscher et al. |
| 2004/0113935 A1 | 6/2004 | O'Neal et al. |
| 2004/0122790 A1 | 6/2004 | Walker et al. |
| 2004/0191744 A1 | 9/2004 | Guirguis |
| 2004/0225743 A1 | 11/2004 | Huggins et al. |
| 2004/0243930 A1 | 12/2004 | Schowtka et al. |
| 2006/0064642 A1* | 3/2006 | Iyer .............................. 715/730 |
| 2006/0166180 A1 | 7/2006 | Gurnee et al. |
| 2006/0236246 A1* | 10/2006 | Bono et al. .................... 715/730 |
| 2008/0070218 A1 | 3/2008 | Ahl et al. |
| 2008/0126943 A1 | 5/2008 | Parasnis et al. |

OTHER PUBLICATIONS

"Presenter view: tools for running a PowerPoint presentation," retrieved from the Internet at: http://web.archive.org/web/20051105011748/http://office.microsoft.com/en-us/assistance; (Copyright 2005); 2 pages.

Fose, Luanne E., "Microsoft PowerPoint 2003," CalPoly, ITS Technology & Learning Services, Revised Nov. 17, 2004, 32 pages, San Luis Obispo.

Extended European Search Report dated Dec. 21, 2012; EP Application No. 07251655.2-2221, (5 pages).

U.S. Appl. No. 11/513,480 entitled "System, Method, and Computer Program Product for Developing a Training Course", filed Aug. 30, 2006 by William J. Ahl, et al.

* cited by examiner

SYSTEM AND COMPUTER PROGRAM PRODUCT FOR DEVELOPING AND DELIVERING A TRAINING COURSE

BACKGROUND

Maintenance and operational training are components of training provided to several segments of industry, government, and the military services. For example, operators and technicians are trained to operate and maintain complex systems, such as aircraft, ships, submarines, nuclear power plants, and the like. Some training may be mandated by regulatory agencies, like the Federal Aviation Administration.

Training is distinguished from education or academia. Education or academia may be considered to be more theoretical and abstract, with less emphasis on applied skills, than training. As such, training can take place in a classroom, on-the-job (OJT), just-in-time (JIT), at home, in the military, and the like.

Creating a training course entails developing, configuring, and assembling the training course. Creating current operational and maintenance classroom training is a time-and-labor intensive process.

Developing a training course currently entails a training specialist manually locating applicable training media and materials (such as photos, text, videos, and the like), collating and coping these materials, and inserting them into an authoring-publishing system to create training courseware.

The training courseware may be marked with a legend, such as "For Training Use Only", "Not For Operational or Maintenance Use", or the like, to ensure that the training courseware is not used to operate or maintain in-service systems in the field. Thus, the training courseware may be considered "dedicated" training courseware that is maintained separate from operational and maintenance materials. This can result in a "stove piped" environment, thereby resulting in increased time and costs.

Currently, a training specialist must manually maintain currency and configuration of the training course. To that end, a training specialist must be kept apprised of changes to operational configurations of deployed, in-service systems and to planned engineering changes, revisions, and the like. The training courseware is revised to reflect these changes to operational configurations and engineering changes and revisions. Often, this revision is done in parallel with revision of the original support documentation (that is, the operational and/or maintenance documentation). When the maintenance courseware and the original support documentation are "stove piped" from each other, increased costs can result. This is because the revisions to the stove piped documents represent duplicated efforts made in parallel with each other.

Furthermore, in some applications, the dedicated training media may be limited in applicability to one installation of a system, especially in highly customized applications. For example, a training course for a particular subject, such as maintenance of a particular system, may be applicable to only one aircraft with a particular tail number or to only one ship with a particular hull number. As a result, a different version of a training course may have to be developed for the same subject for the same model aircraft with a different tail number (even if the two aircraft are owned by the same owner) or for another ship in a same class of ships (such as two Ohio Class submarines).

The configured training courseware is then assembled for use in classrooms.

Presenting a training course is also a time-and-labor intensive process. Students (who can include operators, management, maintenance technician, trainers, suppliers, employees of the system's manufacturer, regulators, military personnel, and the like) may have to travel from their place-of-work to a central training facility and then sit in a classroom for up to eight hours a day for up to sixteen weeks per course. In such a presentation scenario, students are not able to receive training on a just-in-time basis to support operations or maintenance. Moreover, operators or maintenance technicians are not easily able to access training media on an as-needed basis if difficulties are encountered while performing a given task in the field.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

Embodiments provide systems and computer software program products that can enable development and delivery of a training course based on electronic media resident in an operational electronic media repository, and/or a training electronic media repository, and/or other sources as desired.

According to an embodiment, a system for developing and delivering a training course includes a course development subsystem and a course delivery subsystem. The course development subsystem includes at least one electronic media repository chosen from an operational electronic media repository and a training electronic media repository, and a first processing component configured to create at least a first slide from electronic media selected from the electronic media repository. The course delivery subsystem includes a training electronic media repository, a computer communications interface configured to access via a computer network the training electronic media repository, a first display subsystem, and a second display subsystem. A first user interface is configured to permit selecting from the training electronic media repository a training course that includes at least a first slide including a presenter screen and further including at least a first presentee screen. A second processing component is configured to generate an image of the at least first slide for display by the first display subsystem. A third processing component is configured to generate an image of the at least first presentee screen for display by the second display subsystem to at least one presentee without displaying the presenter screen to the presentee.

According to an aspect, the operational electronic media repository may include at least one electronic media repository chosen from a production electronic media repository, an operations electronic media repository, and a maintenance electronic media repository.

According to another embodiment, a computer software program product for developing and delivering a training course includes a first computer program code module for developing a training course and a second computer program code module for delivering a training course. The first computer program code module for developing a training course includes first computer program code means for accessing via a computer network at least one electronic media repository chosen from at least an operational electronic media repository and a training electronic media repository and second computer program code means for creating at least one slide from electronic media selected from the electronic media repository. The second computer program code module for delivering a training course includes third computer program code means for accessing from a training electronic media repository via a computer network a training course that includes at least a first slide, the at least first slide including a presenter screen and at least a first presentee screen, fourth computer program code means for displaying to a presenter the presenter screen, and fifth computer program code means for displaying to at least one presentee the at least first presentee screen without displaying the presenter screen to the presentee.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 6, 7, 8, 10, and 15 are screen shots of an exemplary implementation of training course delivery.

DETAILED DESCRIPTION

By way of overview, embodiments provide systems and computer software program products that can enable development and delivery of a training course based on electronic media resident in an operational electronic media repository, and/or a training electronic media repository, and/or other sources as desired.

An overview and explanation will first be given regarding exemplary training courses that may be developed and presented. Details of exemplary embodiments and host environments will then be set forth.

Exemplary Training Course

Overview of Course

As referred to herein, a training course can be considered education imparted in an ordered series of lectures and/or presentations and/or other matters dealing with a subject. A course can be part of a larger curriculum. A course can also be exported as a stand-alone object in a predetermined format, such as without limitation in an Aviation Industry Computer Based Training (CBT) Committee (AICC)-compliant form.

Figure 1:
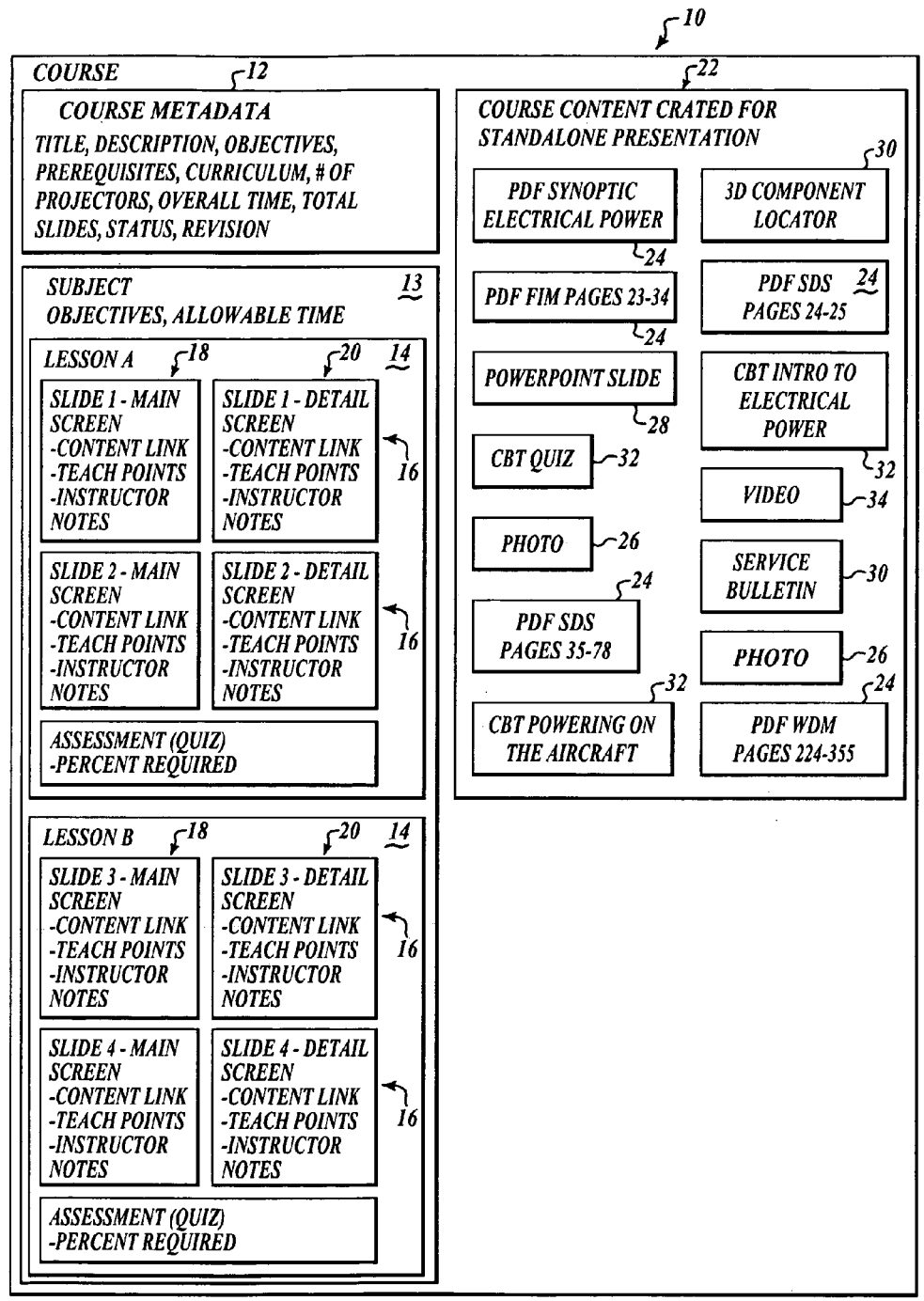
FIG. 1 is an illustration of an exemplary model of a training course.

Referring now to FIG. 1, an exemplary training course 10 is given by way of non-limiting example. The training course 10 can have metadata 12 that describes information about the course 10 and its relationships to other courses or curriculums. For example, the metadata 12 can include without limitation any of: a course title; a course description; course objectives; prerequisites; relationship(s) to curriculum(s); number of projectors used for presenting the course; overall time for presenting the course; total number of slides used in the course; workflow status (such as in-progress, approved, published, archived, or the like) and revision number to track the course 10 through an approval and revision cycle; and the like.

The course 10 can be comprised of a subject (or subjects) 13. The subject 13 suitably is an educational unit that is smaller than the course 10. The subject 13 includes lessons 14. The lessons 14 each can be considered course content, such as a self-contained series of slides 16 which constitute an instructional unit. As will be discussed in detail later, each slide 16 may be considered a placeholder for course content in the form of training media (such as without limitation static media like text or graphics or dynamic media such as animation, CBT (that is, a multi-media presentation designed to convey concepts to a student), a three-dimensional model, or the like). As will also be discussed in detail later, each slide 16 may include, as desired, a link to content as described above. Each slide 16 may also be a placeholder for teaching points and/or instructor points.

In some exemplary embodiments and as will be explained in detail later, the slide 16 may include a main screen 18 and, if desired, a detail screen 20. In a two-screen presentation, the main screen 18 is a screen that provides context or an overview of a current topic and the detail screen 20 is a screen that provides a detailed view of the current topic.

In some embodiments and as will be described later in detail, the course 10 may contain links to course content 22. Alternately, the course content 22 may be stored locally on a computer. However, when the course 10 is exported (that is, saved locally on a computer) the training course 10 can be "crated" or packaged with the course content 22 for stand-alone presentation. The course content 22 may include static media such as a print data file (pdf) 24, a photo 26, a presentation slide 28 (which could also include dynamic media such as animation), or a document 30. The course content 22 may also include dynamic media such as a three-dimensional model 30, CBT 32, video 34, or the like.

Course Configuration

The training courses 10 can support multiple configurations. For example, a training course for a particular subject, such as maintenance of a particular system, can be applicable to more than one aircraft with a particular tail number or to more than one ship with a particular hull number. As a result, an entirely different training course need not be developed from the ground up for the same subject for the same model aircraft with a different tail number (even if the two aircraft are owned by the same owner) or for another ship in a same class of ships (such as two Ohio Class submarines). Given by way of non-limiting examples, an electrical power course may accommodate differences between two engine manufacturers or an avionics course may accommodate different suppliers' components on different airplanes.

In order to accommodate variation in configuration, embodiments provide for a master course and associated course instances. With a master course, a course developer can attach different versions of course content 22 to a slide 16 based on effectivity or installation of the subject matter on a platform, such as on an aircraft of a particular tail number or a ship of a particular hull number or a particular nuclear power plant, or the like. In the electrical power example briefly referred to above, a graphic may exist for aircraft engines made by one aircraft engine manufacturer, such as General Electric Aircraft Engines (GEAE), and an equivalent graphic may exist for aircraft engines made by another aircraft engine manufacturer, such as Rolls Royce. In this instance, both graphics may serve to convey the same educational points, or they may be different.

The course developer can attach both graphics to a single slide in a course template. In this example, the course developer will have to know an aircraft tail number with GEAE engines and another aircraft tail number with Rolls Royce engines in order to attach the appropriate configured content.

When teaching a course to a specific customer or organization, an instructor can use a course template along with a specific tail number or hull number or the like (presumably in the customer's fleet) to generate a course instance which will only contain the course content 22 relevant to the specific tail number or hull number selected. In the electrical power example referred to above, only one of the graphics would be included in a particular course instance depending on the tail number selected.

Now that an overview of the training course 10 has been provided, details will be set forth regarding exemplary embodiments for developing the training course 10 and for delivering the training course 10. This explanation will begin with a functional description.

Functional Description

Figure 2:
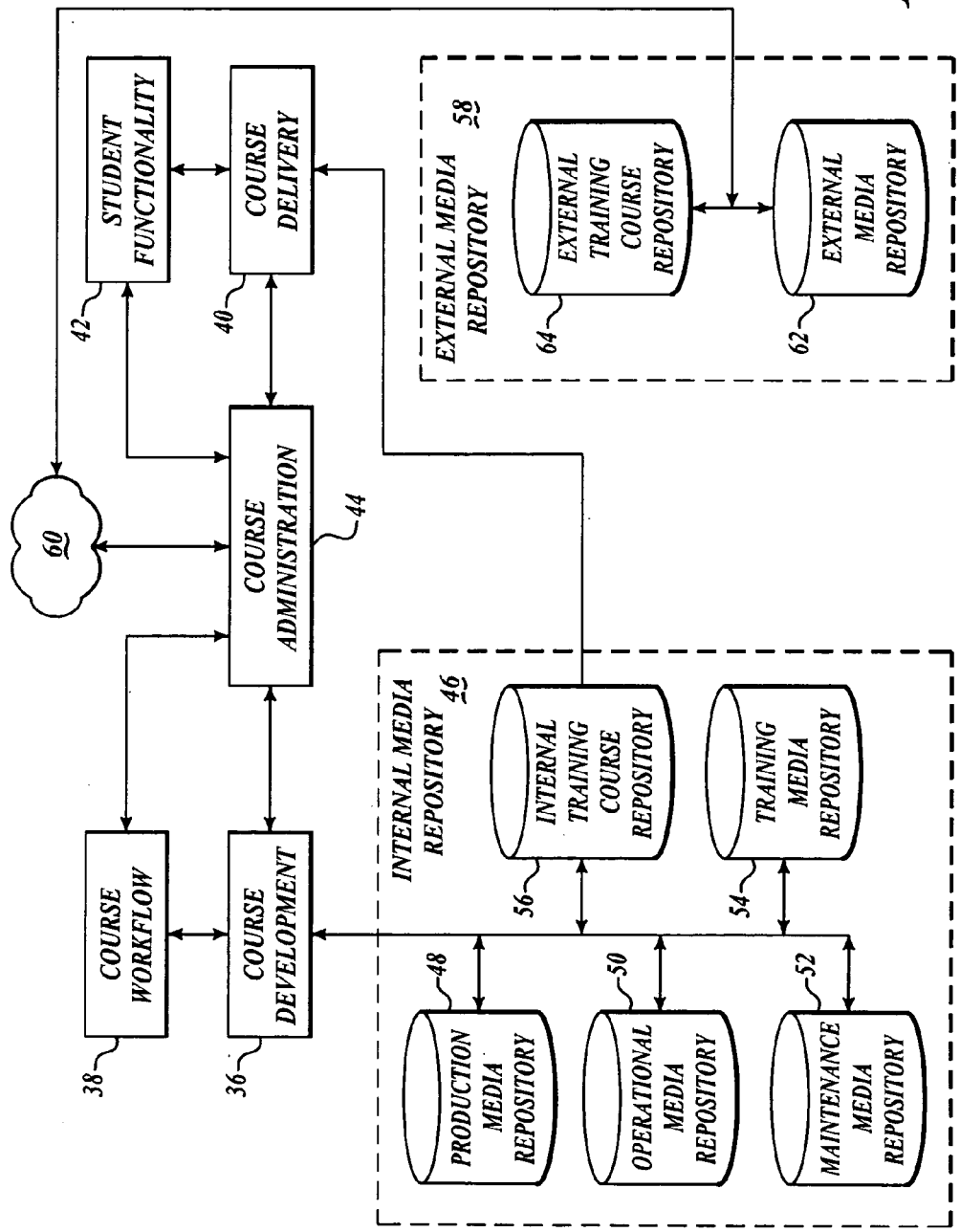
FIG. 2 is a block diagram of exemplary functionality for developing and delivering a training course.

Referring now to FIG. 2, embodiments for developing the training course 10 (FIG. 1) and for delivering the training course 10 (FIG. 1) involve functionality that suitably is provided within a networked computer environment. Functionality associated with developing and delivering the training course 10 includes a course development function 36, a course workflow function 38, a course delivery function 40, student functionality 42, and a course administration function 44.

A course developer uses the course development function 36 to develop and revise the training course 10 (FIG. 1). The course development function 36 can also enable publishing a course, reviewing a course, importing an existing course, exporting a course (that is, sending the course to an external organization), and importing outside media content from an external organization. The course delivery function 40 will also be used by a course developer in order to review and evaluate a training course that is a work-in-progress. Exemplary processing blocks associated with the course development function 36 will be explained in detail below. Development of a training course also is described in a concurrently filed patent application entitled "System, Method, and Computer Program Product for Developing a Training Course" bearing Ser. No. 11/513,480, which is assigned to The Boeing Company, the assignee of this patent application, and which is incorporated by reference.

The course developer is able to access electronic media resident in an internal media repository 46 for selection, collection, and use in developing and revising the training course 10. The internal media repository 46 can include a production media repository 48, an operational media repository 50, a maintenance media repository 52, a training media repository 54, and an internal training course repository 56. As used herein, "internal" refers to content and access to the media repository being under the control of an organization itself, such as via an intranet or local area network, as opposed to control by a third party (such as a system manufacturer's customer, like an airline operator or a military service) or uncontrolled, such as the Internet.

The production media repository 48 can include electronic media used by a manufacturer in designing, building, and/or integrating a system that may be the subject matter of the training course 10. Electronic media that may reside within the production media repository 48 can include without limitation an aircraft illustrated parts manual (AIPC) an aircraft system schematic manual (SSM), a wiring diagram manual (WDM), a ship's systems manual (SSM), a shipboard piping tab, and the like.

The operational media repository 50 can include electronic media used by an operator in operating a system that may be the subject matter of the training course 10. Electronic media that may reside within the operational media repository 50 can include without limitation airline operating procedures, naval aviation tactical operating procedures (NATOPS), civilian and/or naval nuclear power operating procedures (OP) and casualty procedures (CP), and the like.

The maintenance media repository 52 can include electronic media used by maintenance personnel in performing planned maintenance and in troubleshooting and performing corrective maintenance for a system that may be the subject matter of the training course 10. Electronic media that may reside within the maintenance media repository 52 can include without limitation an aircraft maintenance manual (AMM) part II, a fault isolation manual (FIM), a structural repair manual (SRM), a service bulletin, a planned maintenance (PM) card, and the like.

The training media repository 54 can include electronic media typically used by training personnel in training courses. Electronic media that may reside within the training media repository 54 can include without limitation the system description section (SDS) of an aircraft maintenance manual (AMM) part I, computer-based training (CBT) modules and lessons, photographs, videos, Synoptics (e.g., optical synopsis) diagrams (that is, high-level graphical/schematic diagrams of an overview of a subject), three-dimensional animations, three-dimensional component locators, and the like.

The internal training course repository 56 can include electronic media that represents training courses developed or used by an organization. To that end, the internal training course repository 56 can include course metadata 12, subjects 13, lessons 14, and course content 22 that make up training courses 10. The training courses that reside in the internal training course repository 56 can be retrieved by the course development function 36 for updating, reconfiguring, or other revision as desired. The training courses that reside in the internal training course repository 56 can also be retrieved by a course delivery function 40 for presentation or other delivery as desired.

The course workflow function 38 (along with the course development function 36 and course delivery function 40) enables a course developer to review, update, and revise a course that is in-work. The course workflow function 38 (along with the course delivery function 40) also enables a course approver to review an in-work course and approve it for publication. The course workflow function 38 can enable a course developer to work on a training course prior to availability of the training course to an instructor for use in a classroom. The course workflow function 38 can provide for a review and approval process. The course workflow function 38 can also enable receipt of feedback on a training course that has been published and delivered or presented. The course workflow function 38 can assign to a training course 10 a status such as in-work, ready for approval, approved, published, published revised, or the like.

The course delivery function 40 enables presenting an instructor-lead course online (such as via intranet, internet, the web, or the like), presenting a pre-recorded course online, presenting an instructor-lead course off-line, and assessing a student. The course delivery function 40 can access the training course 10 from the internal training course repository 56. When the course delivery function 40 operates in an on-line environment, the course delivery function 40 can access electronic media resident in the internal media repository 46 via links in the slides 16 (FIG. 1) of the training course 10 (FIG. 1). As a result, hyperlinks, hotspots, and other special functions of the electronic media are active.

The student functionality 42 permits a student to add student notes and, if authorized, to access the training course 10 from the internal training course repository 56 for student-led training sessions.

The course administration function 44 allows a course administrator to control use of the course development function 36, the course workflow function 38, the course delivery function 40, and the student functionality 42. The course administration function 44 also allows a course administrator to control permissions and publishing for access and use of training courses.

As an example of permissions and access controlled by the course administration function 44, access may be made available to an external media repository 58 via a network 60, such as the Internet. As used herein, "external" refers to content and access under the control of a third party or uncontrolled. Given by way of non-limiting example, the external media repository 58 may be a repository of electronic media, the contents of which and access to which is controlled by a third party, such as a customer of the organization that is developing and/or delivering a training course.

The external media repository 58 may include an external media repository 62 in which resides electronic media under the control of the third party. When granted access by the course administration function 44, a course developer may access the external media repository 62 via the network 60 and use electronic media resident in the external media repository 62 in developing a training course for the customer using the course development function 36. Similarly, when granted access by the course administration function 44, an instructor may access a customer's training course resident in an external training course repository 64 and present the customer's training course to students using the course delivery function 40. To that end, the external training course repository 64 can include course metadata 12, subjects 13, lessons 14, and course content 22 that make up training courses 10.

The functionality described above is well suited for use by a manufacturer of a system or a systems integrator for use in developing a training course and/or delivering or presenting the training course to operators and/or maintainers of the system. For example and given by way of non-limiting example, an aircraft manufacturer can develop and/or deliver a training course to operators and maintenance technicians employed by an airline or military service that operates aircraft made by the aircraft manufacturer. However, an airline, military service, or other operator or maintainer of a system (as opposed to the manufacturer or integrator of the system) may also use a tool that includes functionality described above to develop and/or deliver a training course to its own operations and/or maintenance personnel. Notwithstanding, the functionality described herein is applicable to any organization whatsoever that desires to develop and/or deliver a training course.

Other embodiments suitably operate as a stand-alone application instead of in a networked computer environment. Such a configuration enables an instructor to use the course delivery function 40 to present a training course in the field. In addition, an instructor can use the course delivery function 40 to add content and instructor notes while in the field. However, some of the course content 22 (FIG. 1) may have limited functionality because links are not active.

Figure 3:
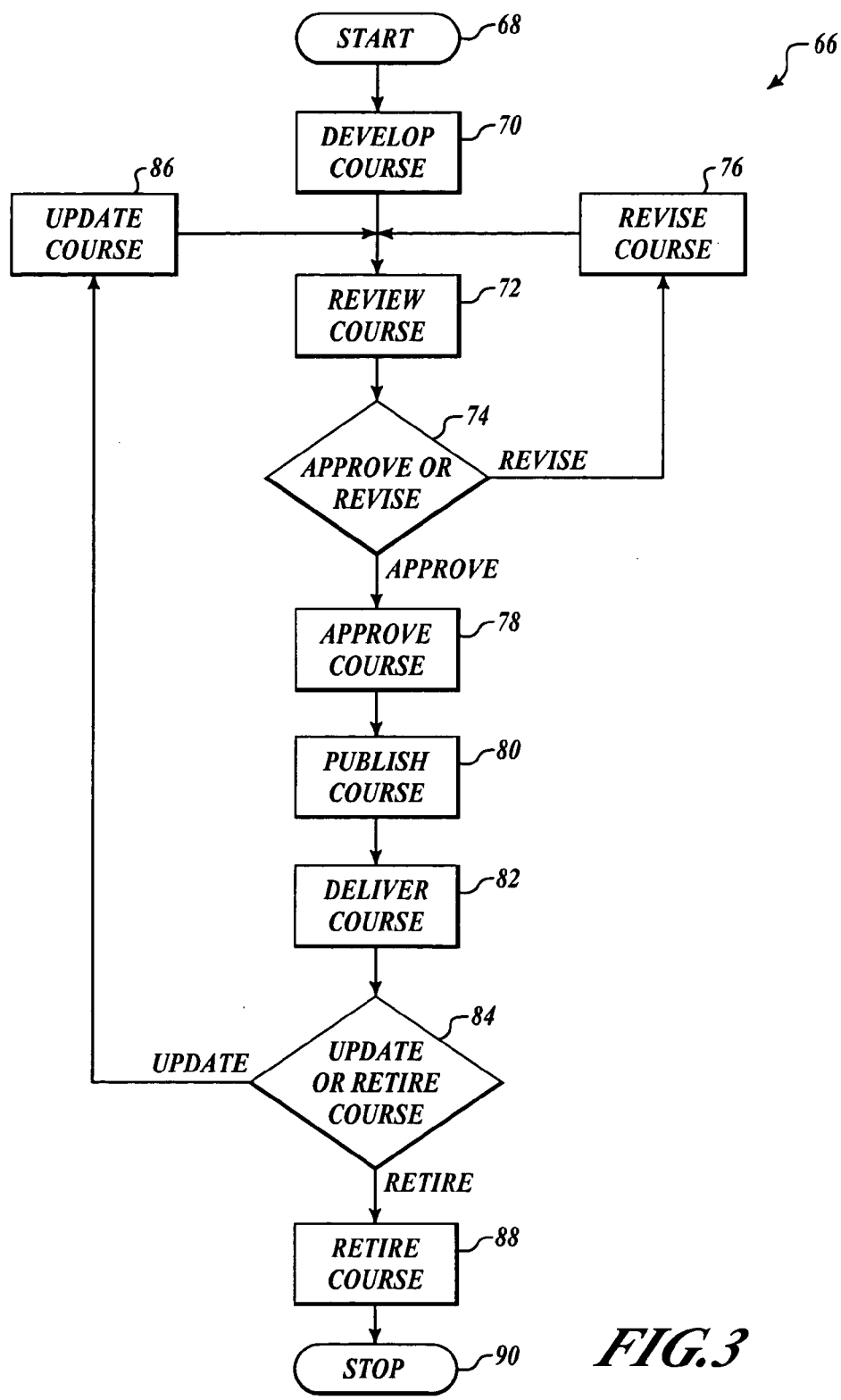
FIG. 3 is a high level flow chart of an exemplary method of developing, administering, and delivering a training course.

Referring additionally to FIG. 3, a process 66 processes the functionality shown in FIG. 2. The process 66 starts at a block 68. At a block 70, the training course 10 (FIG. 1) is developed. The processing performed at the block 70 processes the functions of the course development function 36. At this point in the process 66, the course workflow function 38 can be used to assign to the training course 10 a status of "in-work", "work-in-progress", or the like. Details of processes performed at the block 70 will be discussed later.

At a block 72 the training course 10 is reviewed. The course developer uses the course development function 36, the course workflow function 38, and the course delivery function 40 to review the training course 10 while it is in-work. The course developer can then use the course workflow function 38 to assign to the training course 10 a status of "ready for approval". A course reviewer uses the course workflow function 38 and the course delivery function 40 to review the training course 10 when it is ready for approval.

At a decision block 74 the course reviewer makes a determination whether to approve the training course 10 for publishing or to have revisions made to the course. If the training course 10 is to be revised, then at a block 76 revisions are made to the training course 10. The revisions are made by either the course developer or the course reviewer using the course development function 36. After the revisions have been made to the training course 10, the training course is reviewed again at the block 72 and the determination whether to approve the training course 10 is made again at the decision block 74.

When the course reviewer has determined that the training course 10 is ready for approval, at a block 78 the course reviewer approves the training course 10 using the course workflow function 38. The status of the training course 10 is changed from "ready-for-approval" to "approved".

At a block 80 the approved training course 10 is published. To that end, the training course 10 is saved in the internal training course repository 56 or the external training course repository, as appropriate. The course workflow function 38 is used to change the status of the training course 10 to "published".

At a block 82, when desired, the training course 10 is delivered. Using the course delivery function 40, an instructor retrieves the training course 10 from the internal training course repository 56 or the external training course repository, as appropriate, and presents the training course 10 to one or more students in a setting as desired. Details of delivering the training course 10 will be set forth later.

At a decision block 84, a determination is made whether to update or retire the training course 10. It may be desirable to update the training course 10 to accommodate feedback received from previous presentations of the training course 10, to accommodate updates or changes to the system or equipment that is the subject matter of the training course 10, to accommodate new or revised operating procedures or government regulations, or the like.

If the training course 10 is to be updated, then at a block 86 the training course 10 is updated. A course developer uses the course development function 36 to update the training course 10 to revise the course content 22, add new content to the course content 22, or delete obsolete content from the course content 22, as desired. The course workflow function 38 is used to assign to the training course 10 a status of "published-revised". The process 66 returns to the block 72 and proceeds as described above.

If a determination is made to retire or archive the course, then at a block 88 the training course is retired or archived. A training course may be archived because the system or equipment that is the subject matter of the training course is no longer used or because the platform or facility in which the system or equipment is installed has been deactivated, "mothballed", or the like. The course workflow function 38 is used to assign to the training course 10 a status of "retired", "archived", or the like. The process 66 ends at a block 90.

Course Development

Figure 4A:
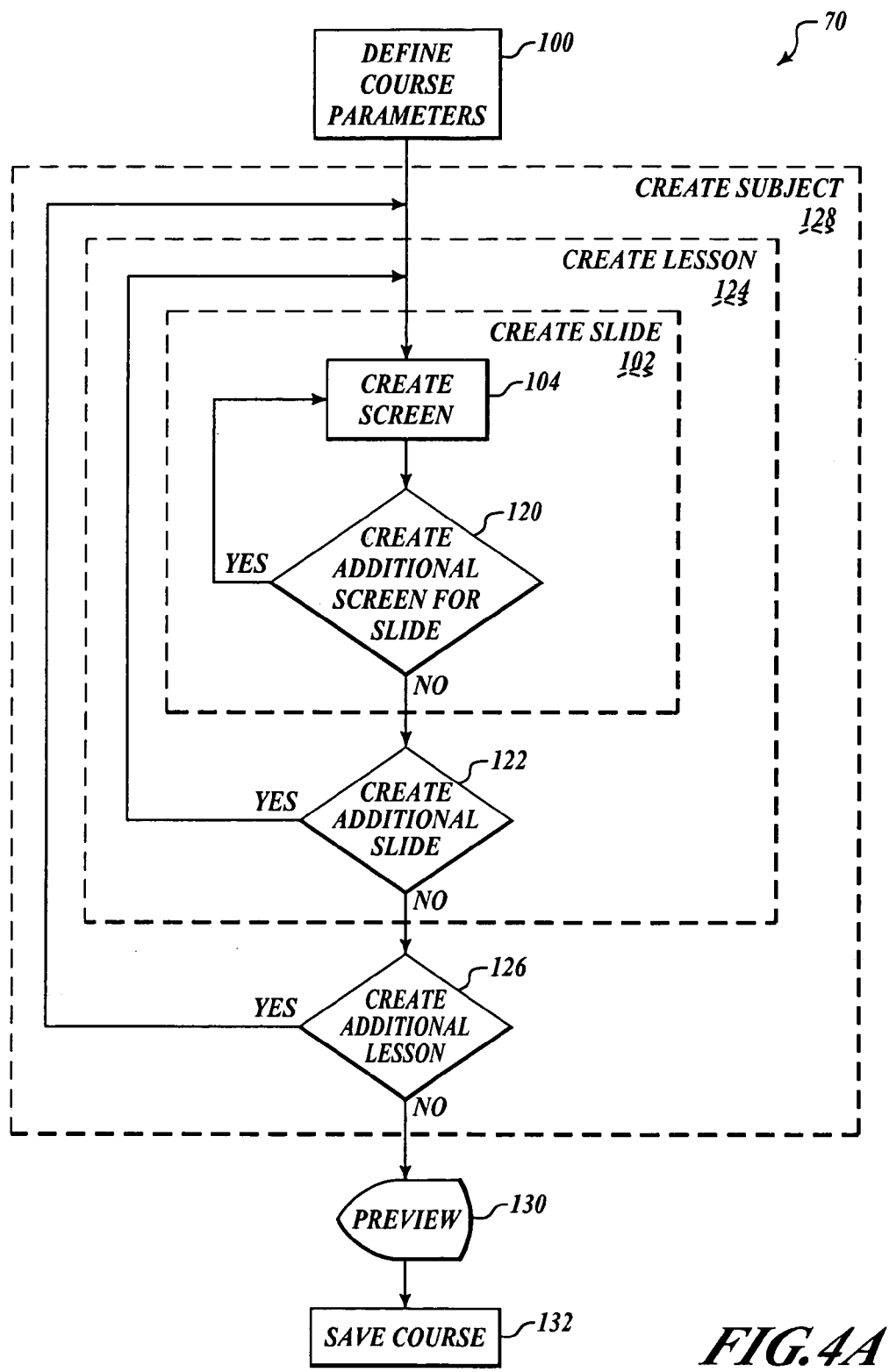
FIG. 4A is a flow chart of an exemplary method of developing a training course.

Now that an overview has been given in terms of function and processes, a more detailed explanation will now be set forth, by way of example and without limitation, regarding course development. Referring now to FIGS. 1 and 4A, details are set forth regarding the block 70 (FIG. 3) at which the training course 10 is developed.

At a block 100 parameters for the training course 10 are defined. The parameters for the training course 10 suitably may be included among the metadata 12 for the training course 10. As such, the parameters may include a course title; a course description; course objectives; prerequisites; relationship(s) to curriculum(s); number of projectors used for presenting the course; overall time for presenting the course; total number of slides used in the course; workflow status (such as in-progress, approved, published, archived, or the like) and revision number to track the course 10 through an approval and revision cycle; and the like.

At a block 102 a slide 16 is created. As discussed above, each slide 16 may be considered a placeholder for the course content 22 in the form of training media, and each slide 16 may include, as desired, a link to the course content 22 and/or to the internal training media repository 54. Each slide 16 may also be a placeholder for text, such as teaching points and/or instructor points, or the like.

Figure 4B:
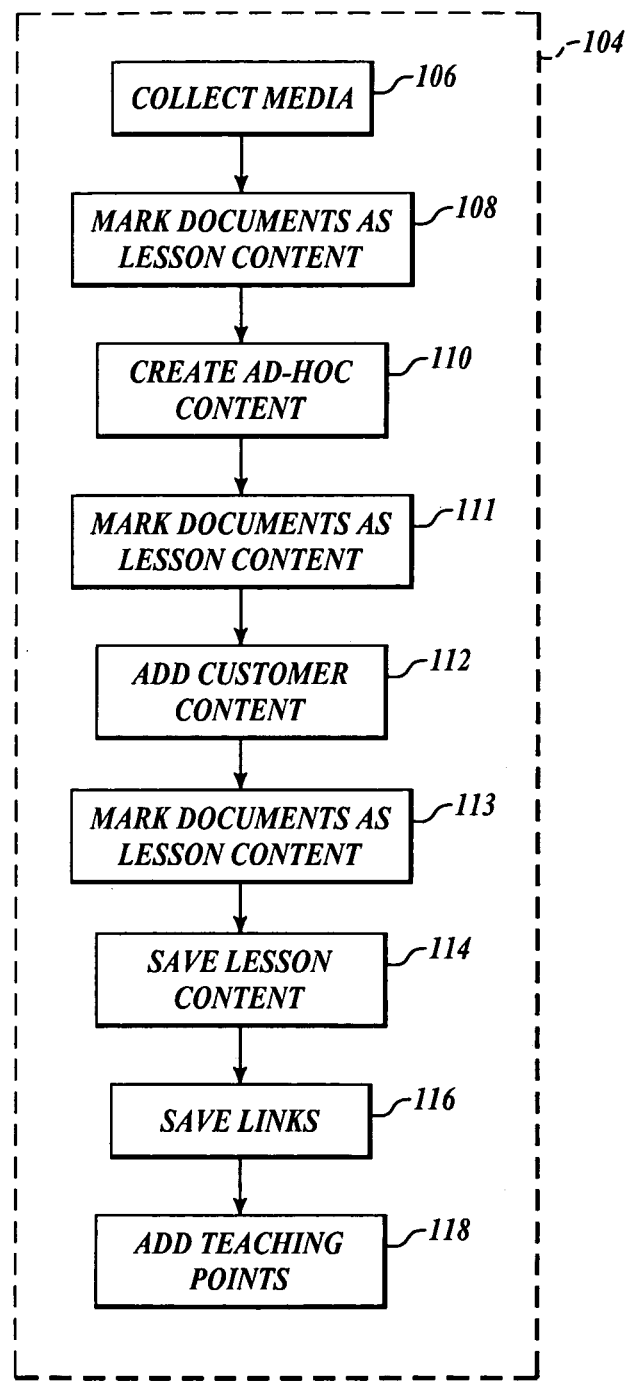
FIG. 4B is a flow chart of details of the method of FIG. 4A.

At a block 104 a screen 18 is created. Referring additionally to FIG. 4B, details will be explained regarding processes that may take place for creating the screen 18 at the block 104. While processing blocks within the block 104 are shown in a sequential ordering in FIG. 4A, the order shown for the process blocks of the block 104 is not limiting. Thus, some of the processing blocks can be performed in a different order than is shown in FIG. 4A. Further, some of the processing blocks shown in FIG. 4A are optional and, as a result, may not be performed at all.

At a block 106 media is collected. For example, a course developer may access and search repositories within the internal media repository 46, such as the production media repository 48, the operational media repository 50, the maintenance media repository 52, and/or the training media repository 54 (all FIG. 2). The course developer collects, that is selects, electronic media from the repositories as desired for the screen being created.

Given by way of non-limiting example, when two screens per slide 16 have been defined as course parameters, a first instance of creating a screen at the block 104 creates a main screen 18 (that is, a screen that provides context or an overview of a current topic). In some embodiments, a Synoptics diagram may be well suited for selection at the block 106 as media for the main screen 18 created at the block 104.

At a block 108 the document from the media collected at the block 106 is marked as lesson content. That is, the document has been collected and a copy and/or link has been obtained. To that end, the document can be considered part of the screen being created.

At an optional block 110, if desired, a course developer may create ad-hoc content for the slide 16. That is, a course developer may optionally add content, or a link thereto, that is not resident in the internal media repository 46. Given by way of non-limiting example, a course developer may select: electronic documents (such as without limitation word processor documents like Microsoft Word documents, presentation slides like Microsoft PowerPoint slides, diagrams such as Microsoft Visio diagrams, print data files such as Adobe Acrobat files, or the like); html pages on an organization's Intranet or on the Internet; images captured from drawing boards; video; CBT; simulation based training (SBT); or the like. If ad-hoc content has been added at the block 110, then at a block 111 the ad-hoc content is marked as lesson content in the same manner as the block 108.

At an optional block 112, if desired, a course developer may add content from a third party, such as without limitation a customer like an airline or a military service or the like. To that end, a course developer may access via the network 60 (FIG. 2) the external media repository 58 (FIG. 2) and select electronic media from the external media repository 62 (FIG. 2) or a link thereto. If third-party content has been added at the block 112, then at a block 113 the third-party content is marked as lesson content in the same manner as the block 108.

At a block 114 the content from the media selected at the block(s) 106, 110, and/or 112 may be saved. When the content from the selected media is saved, the training course 10 may be presented off-line by an instructor.

Alternately, at a block 116 a link to the selected media may be saved. When the link to the media is saved, the selected electronic media resident in the internal media repository 46 and/or the external media repository 58 can be accessed via links in the slides 16 during delivery of the training course 10. As a result, hyperlinks, hotspots, and other special functions of the electronic media are active.

At a block 118, teaching points may be added, if desired. The teaching points are knowledge items to be conveyed by an instructor during delivery or presentation of the training course 10. The teaching points may be graphical content, a list of "bullet points" or may be complete sentences, or any combination thereof. As such and as will be discussed later, during delivery of the training course 10 the teaching points are viewable only by the instructor but are not viewable by the student(s). That is, the teaching points, if added, are considered part of the slide 16 but are not viewable by the student(s) as part of the main screen 18 and/or, when provided, the detail screen 20.

Referring back to FIGS. 1 and 4A, at a decision block 120 a determination is made whether an additional screen (that is, the detail screen 20) is to be created for the slide 16 currently being created. If so (and as indicated by the course metadata 12), then processing of the block 70 returns to the block 104 at which the detail screen 20 is created.

When an additional screen is not to be created for the slide 16 (that is only the main screen 18 is to be created or the main screen 18 and the detail screen 20 have both been created for the slide 16), then the processing of the block 70 proceeds to a decision block 122. At the decision block 122, a determination is made whether an additional slide 16 is to be created for the lesson 14. If so (and as indicated by the course metadata 12), then the processing of the block 70 returns to the block 102 and another slide 16 is created. Thus, processing of the blocks 102 and 122 may be considered as a block 124 at which a lesson is created.

If no additional slides 16 are to be created for the lesson 14, then the processing of the block 70 proceeds to a decision block 126. At the decision block 126, a determination is made whether an additional lesson 14 is to be created for the training course 10. If so (and as indicated by the course metadata 12), then the processing of the block 70 returns to the block 102 and another slide 16 is created. Thus, processing of the blocks 102, 124, and 126 may be considered as a block 128 at which a subject 13 is created.

When no additional lessons 14 are to be created for the subject 13, the processing of the block 70 proceeds to a block 130 at which the training course is previewed. Previewing the course entails use of the course delivery function 40 (FIG. 2) by the course developer.

At a block 132 the training course 10 is saved. For example, the training course 10 may be saved in the internal training course repository 56 or the external training course repository 64, as appropriate. The training course 10 is thus made available for retrieval for further review, revision, approval, and delivery, as desired.

Course Delivery

Now that an overview has been given in terms of function and processes, a more detailed explanation will now be set forth, by way of example and without limitation, regarding exemplary delivery of a training course that has been developed as set forth above. Delivery of a training course also is described in a concurrently filed patent application entitled "System, Method, and Computer Program Product for Delivering a Training Course" bearing Ser. No. 11/513,688, which is assigned to The Boeing Company, the assignee of this patent application, and which is incorporated by reference.

Figure 5:
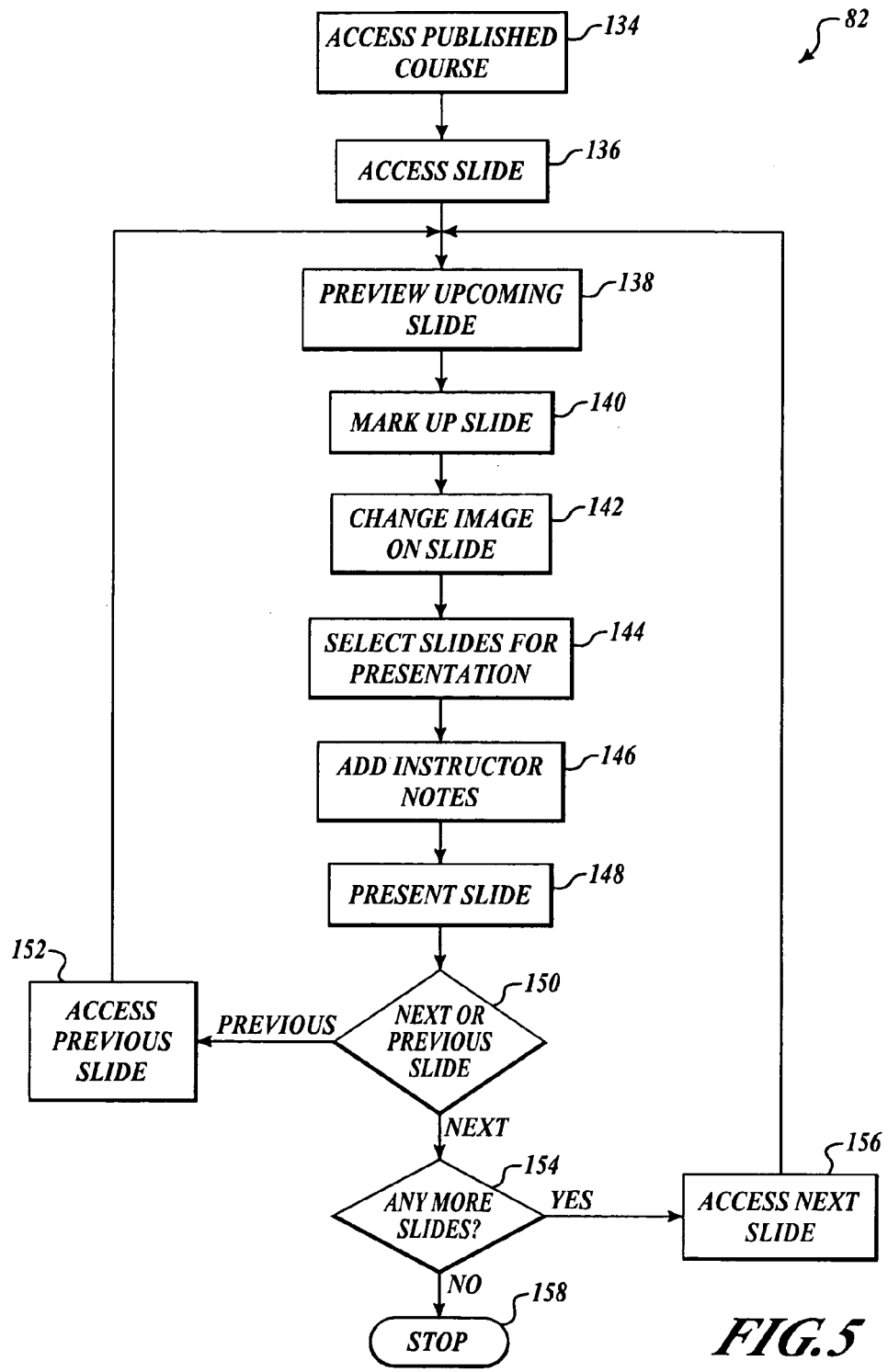
FIG. 5 is a flow chart of an exemplary method of delivering a training course.

Referring now to FIGS. 1 and 5, details are set forth regarding the block 82 (FIG. 3) at which the training course 10 is delivered. While processing blocks within the block 82 are shown in a sequential ordering in FIG. 5, the order shown for the process blocks of the block 82 is not limiting. Thus, some of the processing blocks can be performed in a different order than is shown in FIG. 5. Further, some of the processing blocks shown in FIG. 5 are optional and, as a result, may not be performed at all.

At a block 134, a published training course is accessed. For example, the training course 10 may be accessed and retrieved from the internal training course repository 56 or, via the network 60, from the external media repository 62 (FIG. 2). In some embodiments, the training course 10 is accessed by an instructor for presentation in an instructor-led session. However, in some embodiments (and with appropriate permission granted under the course administration function 44 (FIG. 2)), a student may access the training course 10 from one of the repositories 56 or 62 for a student-led training session. Further, when the training course 10 has been saved in suitable storage, an instructor or student may access the training course 10 from storage for an off-line training session.

At a block 136, a slide 16 is accessed. The slide 16 includes a main screen 18 and may include a detail screen 20. The instructor may view the main screen 18 and, if present, the detail screen 20. The instructor may also view teaching points if they have been included in the slide 16. When a student accesses the slide 16, the student may view the main screen 18 and the detail screen 20. If desired by the instructor, the student may view selected information from the slide 16. When the training course 10 is accessed from off-line storage, some of the functions of the course content 22 may not be available because links in the slides 16 will not be active.

At a block 138, if desired an instructor may optionally preview an upcoming slide 16. The instructor may select an upcoming slide for previewing and display the upcoming slide in a document viewer. However, the main screen 18 and, if present, the detail screen 20 remain displayed for the student.

At a block 140, if desired an instructor may optionally mark up a slide 16 (that is, the main screen 18 and/or the detail screen 20). Using an appropriate annotation tool, the instructor may mark up or annotate appearance of the main screen 18 and/or the detail screen 20. The instructor may display to the student(s) the annotation in real time as the annotation is being made. Alternately, if desired, the instructor may mark up the content without the annotation being displayed to the student(s) during the annotation process. In this case, the marked-up content is displayed to the student after the annotation is performed. Given by way of further non-limiting example, annotation may have been performed as part of development of screens of the slide 16. That is, one screen of a slide 16 may have been developed that shows all of the annotations to be made by the instructor or a series of screens for slides 16 may have been developed that incrementally display to the student(s) the annotations to be made by the instructor. Because the annotations are part of the screens of the slides, the annotation(s) may be accessed by the student(s).

At a block 142, if desired an instructor may optionally change the image on the slide 16 that is being displayed to the student via the main screen 18 or, if applicable, the detail screen 20. Such a change of image may be effected by linking to any electronic media resident in the repositories 46 or 58, as desired, or to any media resident in local storage, as desired. In exemplary embodiments a change in displayed image is temporary—that is, the changed image is not saved as part of the training course 10. This feature provides flexibility to an individual instructor in presenting the training course 10 while maintaining configuration control over changes or revisions to the training course 10.

At a block 144, if desired an instructor may optionally select slides for presentation. That is, an instructor may select a slide(s) to "hide" from presentation. Thus, when navigating through the lesson 14 (such as by accessing a next slide or a previous slide from the current slide), a "hidden" slide that has been thus selected will not be displayed via the main screen 18 and/or the detail screen 20 associated with the "hidden" slide. To that end, a slide that is thus selected will be "skipped over" during presentation of the training course 10.

At a block 146, if desired an instructor may optionally add instructor notes to the slide 16. The instructor notes suitably are informational points related to the current slide 16 that optionally may be added by an instructor to supplement the teaching points or to personalize instruction by an individual instructor, as desired. The instructor notes are not considered part of the configuration of the training course 10. As such, instructor notes may be added as desired by an instructor using the course delivery function 40 (FIG. 2) without invoking review and approval via the course workflow function 38 (FIG. 2).

At a block 148, the slide 16 is presented. The instructor presents the material that is the subject matter of the slide 16, including any teaching points, as desired to achieve desired instructional objectives regarding the subject matter displayed on the main screen 18 and, if applicable, the detail screen 20.

After the current slide 16 is presented, at a decision block 150 a determination is made whether to access the next slide or the previous slide. When the previous slide is to be accessed, then at a block 152 the previous slide is accessed and the process 82 returns to the block 138. If at the block 144 the previous slide had been selected to be "hidden" from presentation, then the previous slide will be skipped.

When the next slide is to be accessed, then at a decision block 154 a determination is made whether there is at least one more slide 16 in the training course 10. When there is at least one more slide 16 remaining in the training course 10, then at a block 156 the next slide is accessed and the process 82 returns to the block 138. If at the block 144 the next slide had been selected to be "hidden" from presentation, then the next slide will be skipped.

When there are no more slides 16 remaining in the training course 10, then the process 82 stops at a block 158.

Exemplary Implementation

Now that exemplary embodiments of course development and course delivery have been described in functional and process terms, an exemplary implementation of tools for course development and delivery will be explained by way of a non-limiting example.

Course Development

Figure 6:
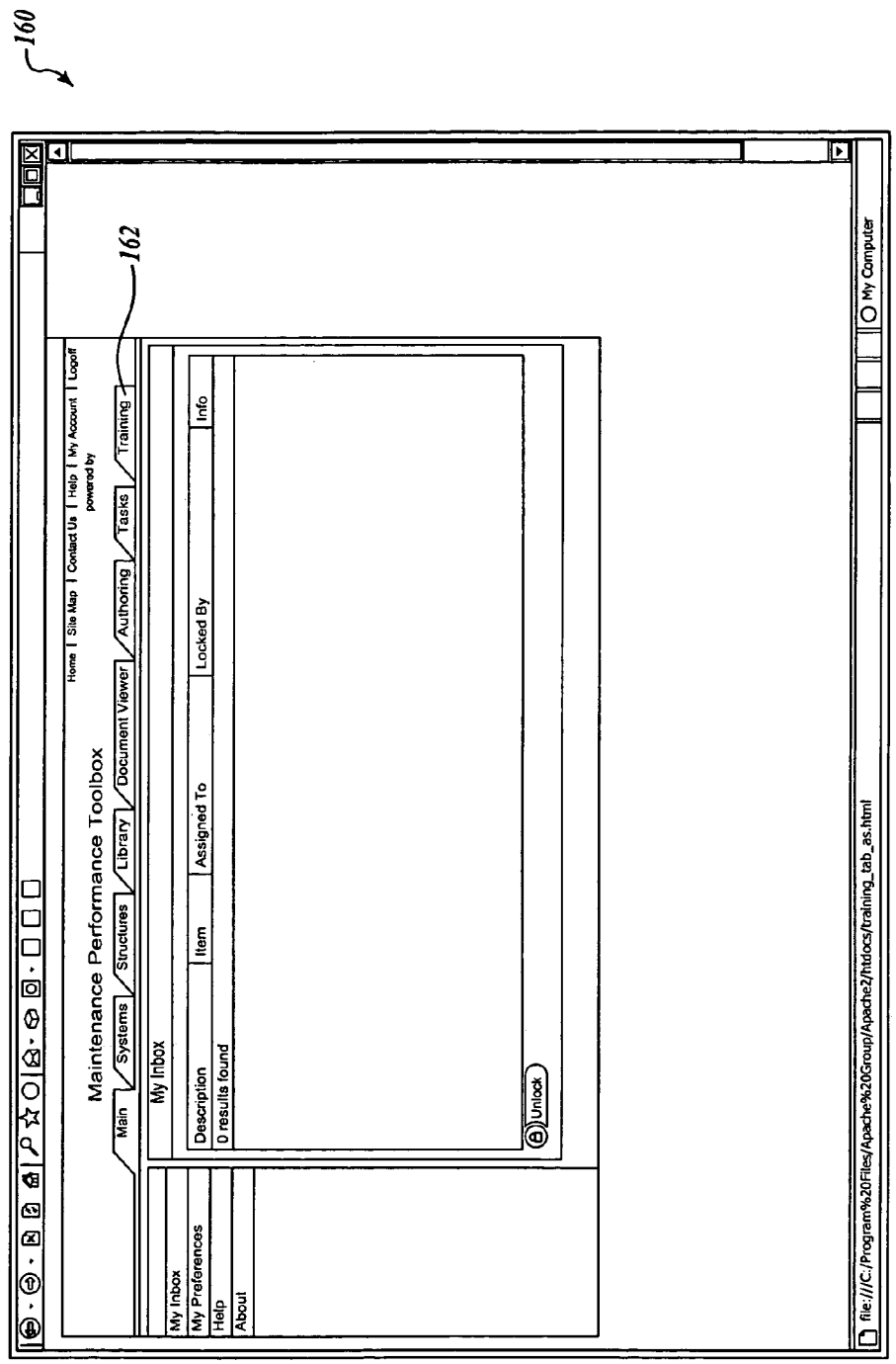
FIGS. 6-14 are screen shots of an exemplary implementation of training course development.

Referring now to FIG. 6, a screen 160 of a graphical user interface (GUI) is presented. The screen 160 suitably may be a main screen of an exemplary multi-function tool provided for manufacturers, operators, maintainers, managers, administrators, trainers, and the like, associated with a system or systems. While exemplary screens will be presented in the context of an airplane, embodiments are not intended to be limited as such. Instead, embodiments can be applicable to any system whatsoever as desired.

One of the functions that can be accessed is a training function. The training function includes an exemplary tool for developing a training course and an exemplary tool for delivering a training course. Both of the tools may be packaged together as an exemplary tool for developing and delivering a training course. To access an exemplary training course development tool, a course developer clicks on a training tab 162.

Figure 7:
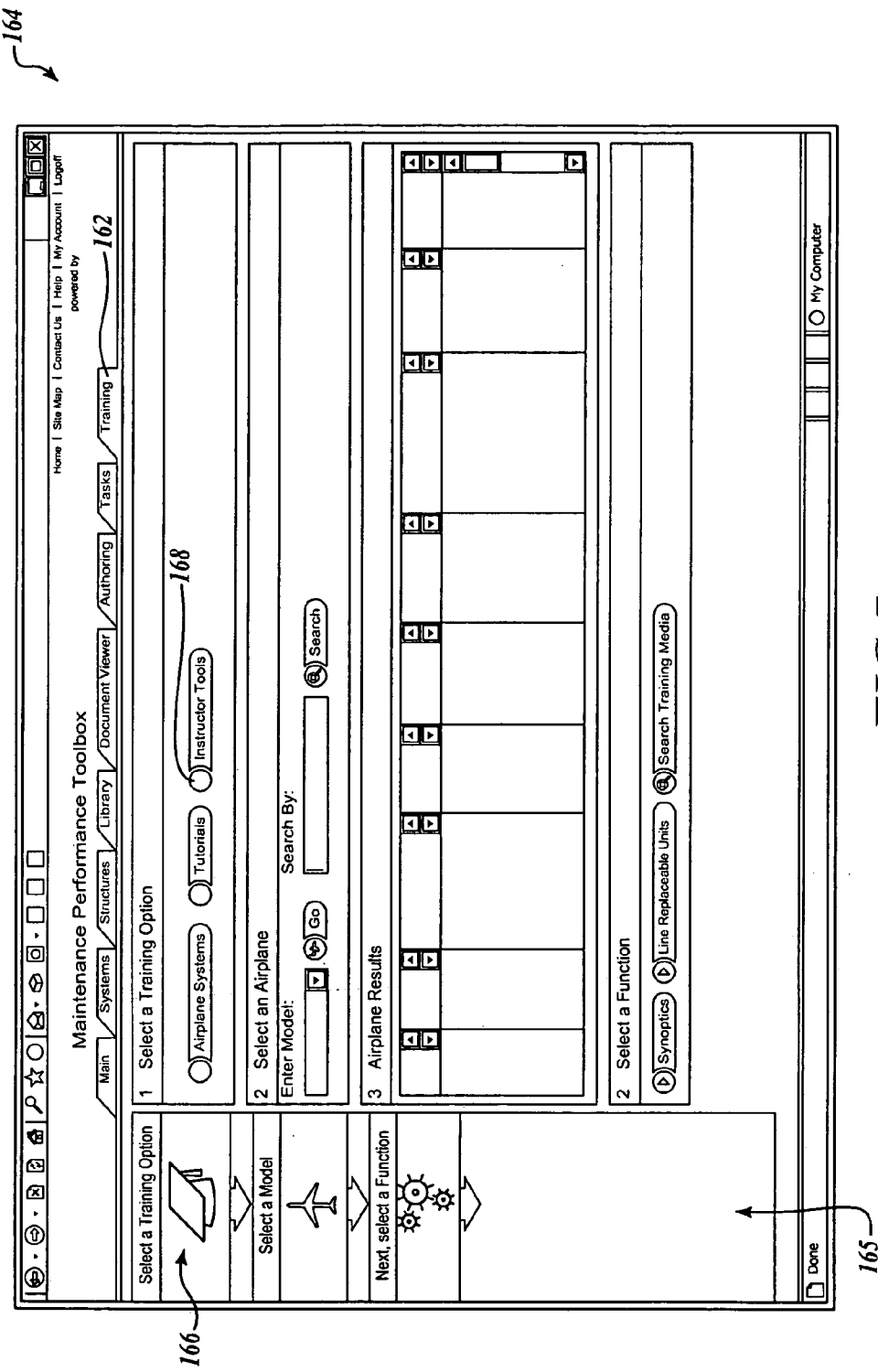

Referring now to FIG. 7, a screen 164 is presented responsive to clicking on the tab 162. The screen 164 is a main screen for an exemplary training tool and includes a process bar 165. In one embodiment, the training tool suitably is applicable to airplanes. However, the training tool is well-suited for any other system whatsoever, such as ships or submarines or nuclear power plants or the like, and is not intended to be limited. A prompt 166 may be highlighted in any acceptable manner, such as by a brightened color or higher intensity than its surroundings, to prompt a user to select a training option. To begin developing a course, a course developer clicks on a button 168 to access instructor tools. As such, the course development function 36 (FIG. 2) is activated.

Figure 8:
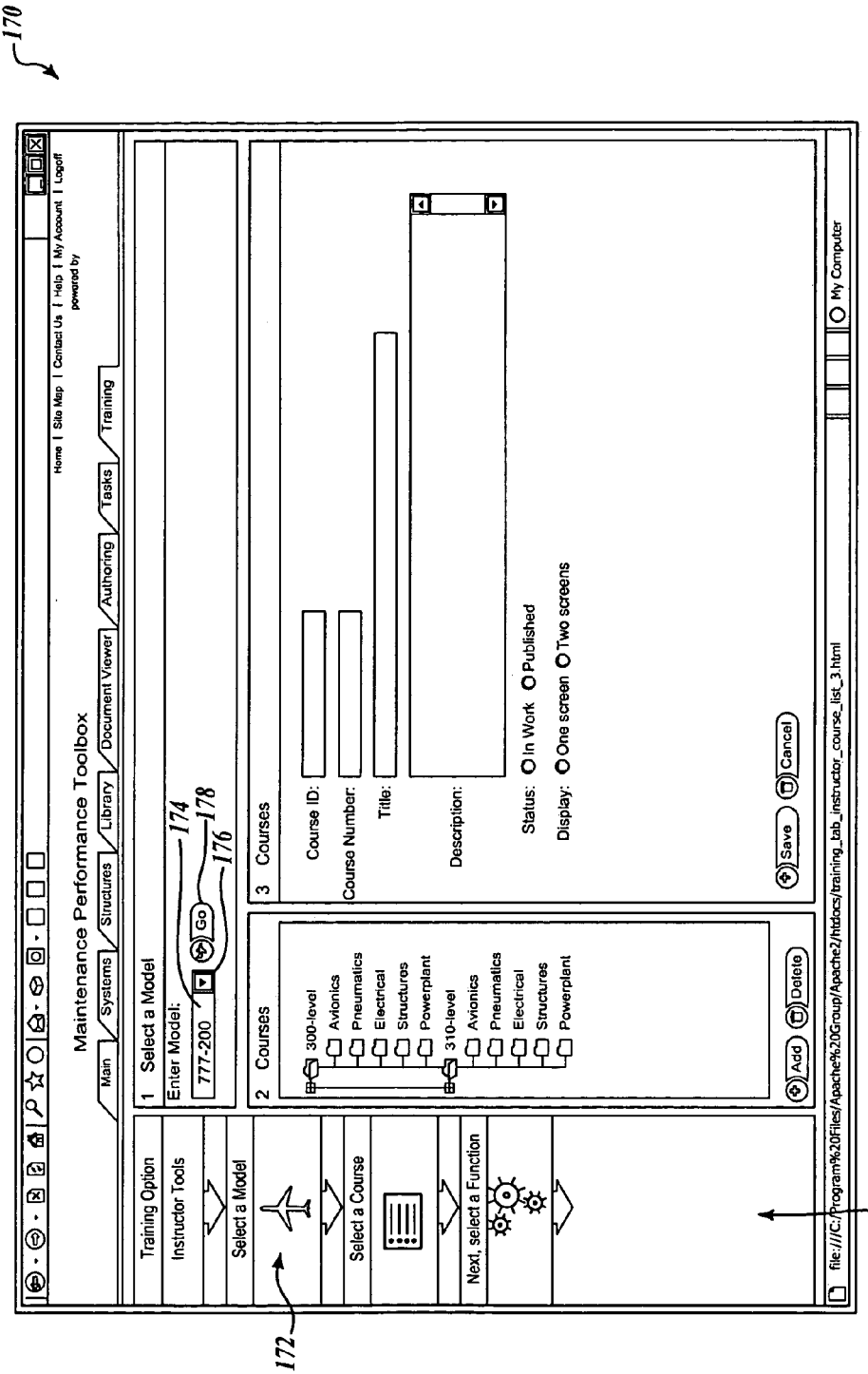

Referring now to FIG. 8, a screen 170 is presented responsive to clicking on the button 168 (FIG. 7). A prompt 172 may be highlighted in any acceptable manner, such as by a brightened color or higher intensity than its surroundings, to prompt a user to select an airplane model. A course developer enters a model number in a field 174 or, if desired, may click on an arrow 176 and select an airplane model from a list presented by a drop-down menu (not shown). After selecting a model, the course developer clicks on a "go" button 178.

Figure 9:
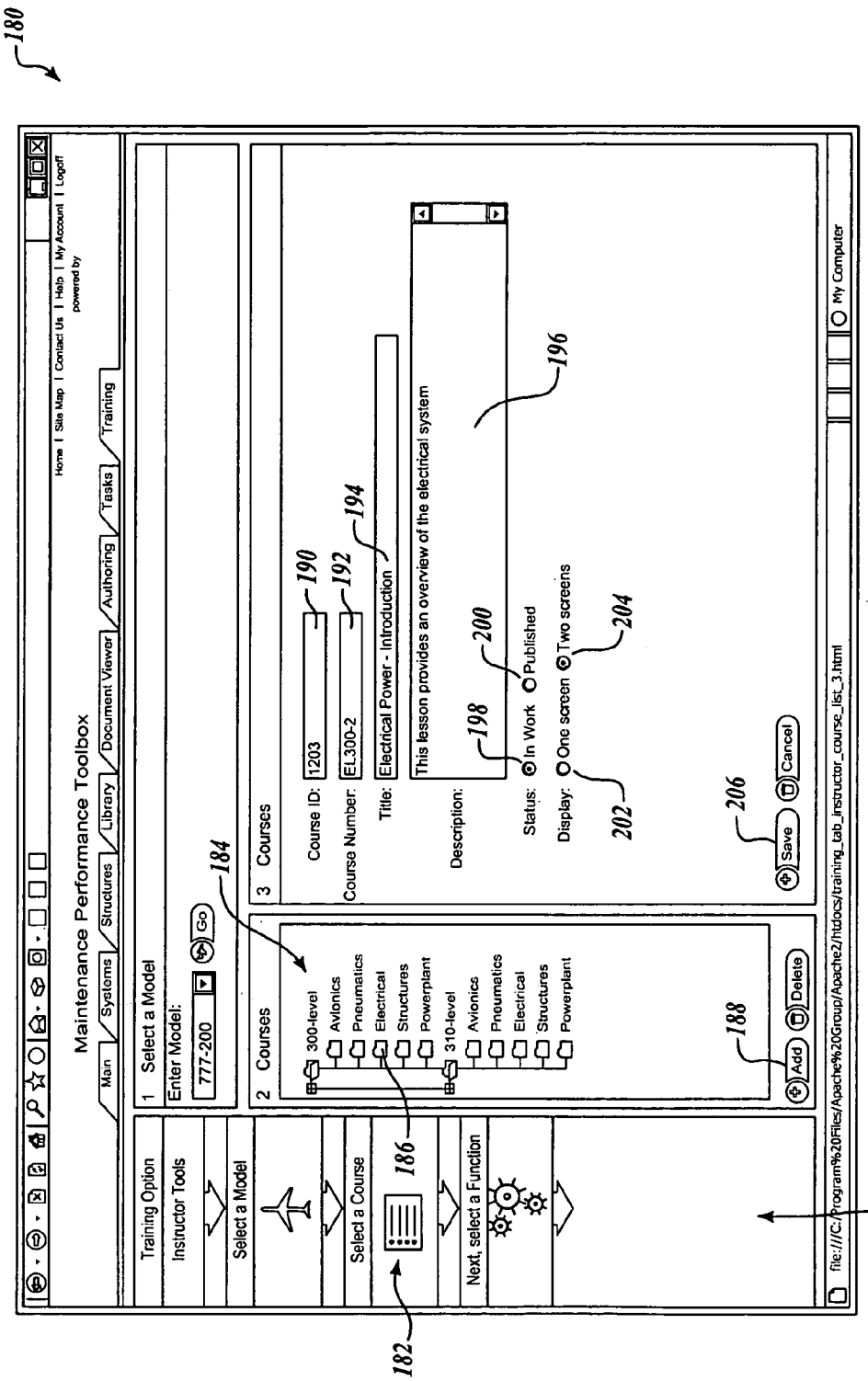

Referring now to FIG. 9, a screen 180 is presented responsive to clicking on the button 178 (FIG. 8). A prompt 182 may be highlighted in any acceptable manner, such as by a brightened color or higher intensity than its surroundings, to prompt a user to select a course. A course developer can select one of the folders 184 (that may represent a hierarchy of storage in the internal training course repository 56 (FIG. 2) or the external training course repository 64 (FIG. 2)) into which the training course 10 under development will be stored. Given by way of non-limiting example, as shown in FIG. 9 a folder 186 for introductory-level electrical courses has been selected. To add into the folder 186 a new training course to be developed, a course developer clicks on an "add" button 188.

After clicking on the button 188, a course developer begins to enter course metadata 12 (FIG. 1) to define course parameters (see the block 100, FIG. 4A). Given by way of non-limiting example, a course developer may enter a course ID number in a field 190, a Course Number in a field 192, a Title in a field 194, and a Description in a field 196. A radio button 198 may be clicked to select a status of in-work or a radio button 200 may be clicked to select a status of published. In this non-limiting example, the radio button 198 has been clicked to select a status of in-work. A radio button 202 may be clicked to select a one-screen display mode and a radio button 204 may be clicked to select a two-screen display mode. In this non-limiting example, the radio button 204 has been clicked to select a two-screen display mode (that is, the main screen 18 and the detail screen 20). To save the training course 10 (that, at this point includes only the metadata 12 just entered), the course developer clicks on a "save" button 206.

Figure 10:
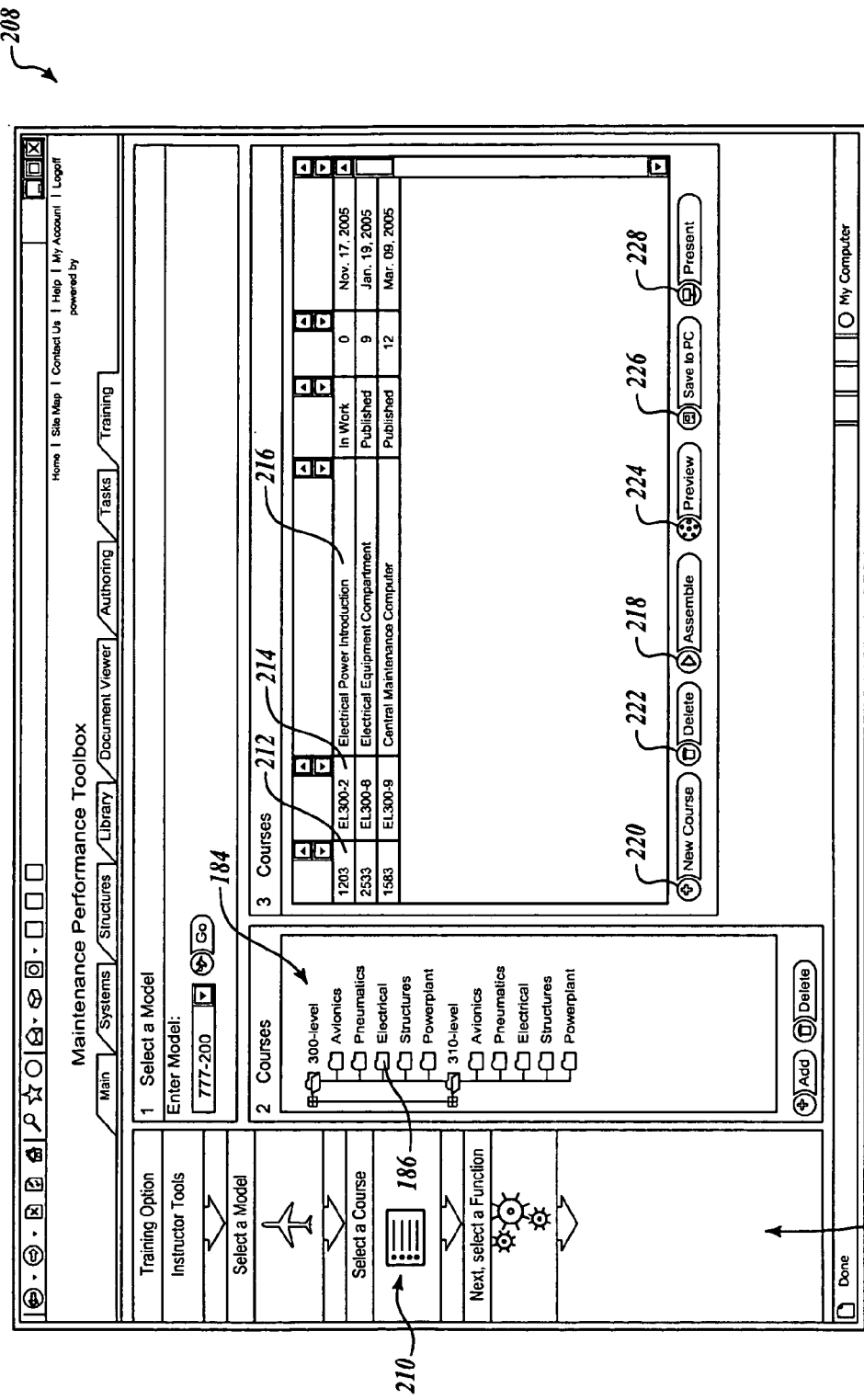

Referring now to FIG. 10, a screen 208 is presented responsive to clicking on the button 206 (FIG. 9). A prompt 210 may be highlighted in any acceptable manner, such as by a brightened color or higher intensity than its surroundings, to prompt a user to select a function. To create the course ID No. 1203, Course No. EL 300-2, entitled "Electrical Power Introduction", a course developer clicks on any entry fields 212, 214, or 216 for ID, Course, or Title, respectively, and then clicks on a button 218 for the function "Assemble". As mentioned above, at this point the course EL 300-2 has just been created and contains only the course metadata 12. Thus, the screen 208 indicates a status of "In Work" and that that the course EL 300-2 includes zero slides.

Other exemplary functions that can selected include a "New Course" function, a "Delete" function, a "Preview" function, a "Save to PC" function, and a "Present" function. A course developer clicks on a button 220 to create a new course that is not shown on the screen 208, thereby returning to the screen 164 (FIG. 7). A course developer clicks on a button 222 to delete a course selected on the screen 208, thereby removing the selected training course from the internal training course repository 56 (FIG. 2) or the external training course repository 64 (FIG. 2). A course developer, a course reviewer, or an instructor clicks on a button 224 to preview a selected training course, thereby invoking the course delivery function 40 (FIG. 2). A course developer clicks on a button 226 to save a selected training course to a computer, thereby enabling "off-line" presentation of the saved training course (although some of the course content 22 may have limited functions because links to the media repositories 46 and 58 will not be active). An instructor clicks on a button 228 to present a selected training course, thereby invoking the course delivery function 40 (FIG. 2).

Figure 11:
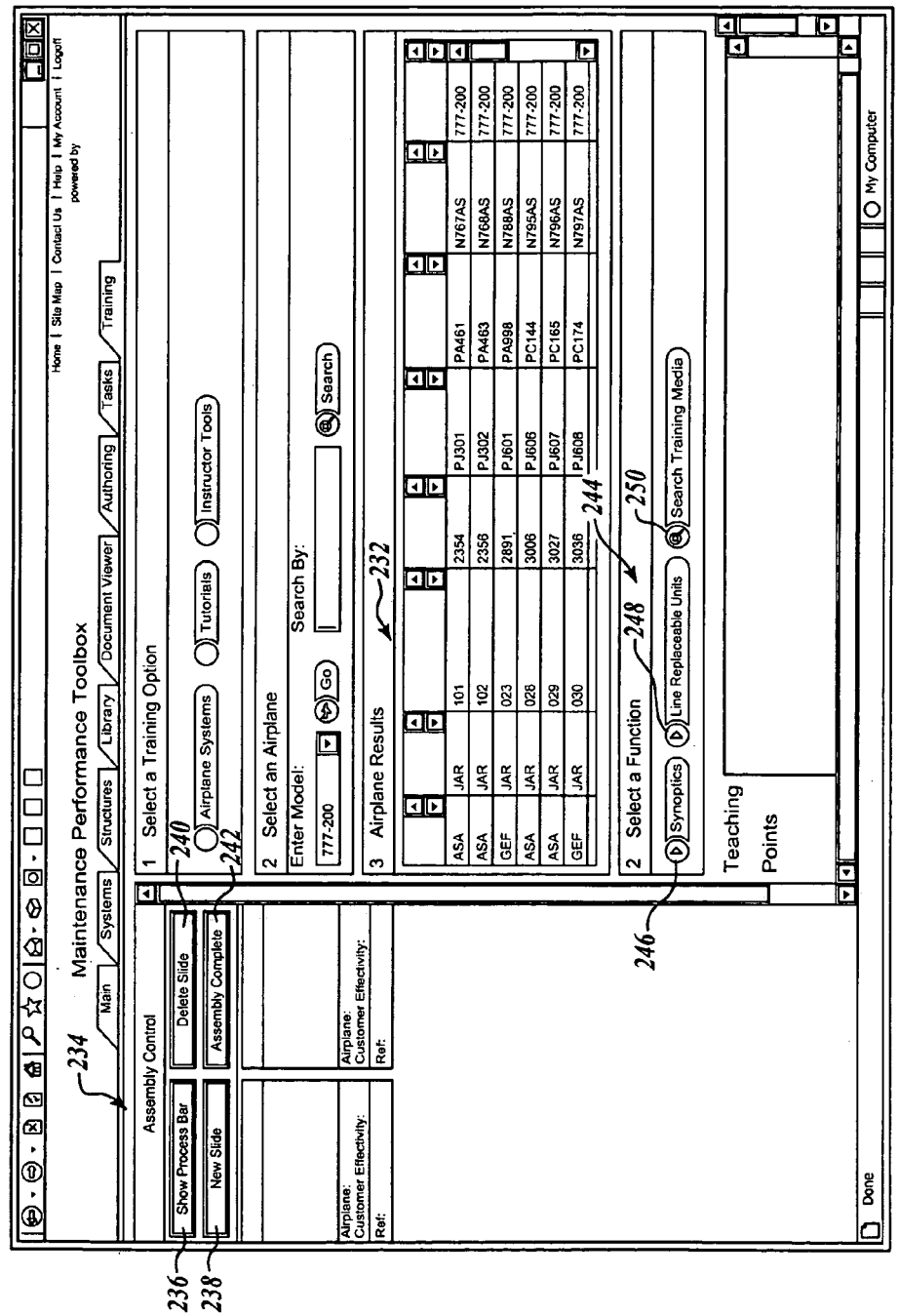

Referring now to FIG. 11, a screen 230 is presented in response to clicking the button 218 (FIG. 10). An effectivity window 232 displays effectivity, that is installations, of the system that is the subject matter of the training course. The effectivity window also includes other identifying information. In this non-limiting example, the effectivity window is directed toward airplanes and, as such, includes identifying information such as an engine set number and a registry (tail) number. In other exemplary embodiments, the effectivity window can include other identifying information, such as hull number (like SSBN 730) and reactor plant type (like S8G, S6G, S5W, or the like).

An "Assembly Controls" window 234 presents tools and information to a course developer. A button 236 can be clicked to show the process bar 165 (FIGS. 7-10). A button 238 can be clicked to insert a new slide and a button 240 can be clicked to delete a slide. A button 242 can be clicked when all desired content has been added and creation of the training course is complete.

A window 244 allows a course developer to select a function to search for, access, and collect media for course content in a number of different, exemplary manners. As a first example, a button 246 can be clicked on to access Synoptics diagrams from any of the media repositories 46 and/or 58. As another example, a button 248 can be clicked on to access a list of line replaceable units (LRUs). From the list of LRUs, a course developer can select an LRU and media associated therewith for inclusion as course content.

Figure 12:
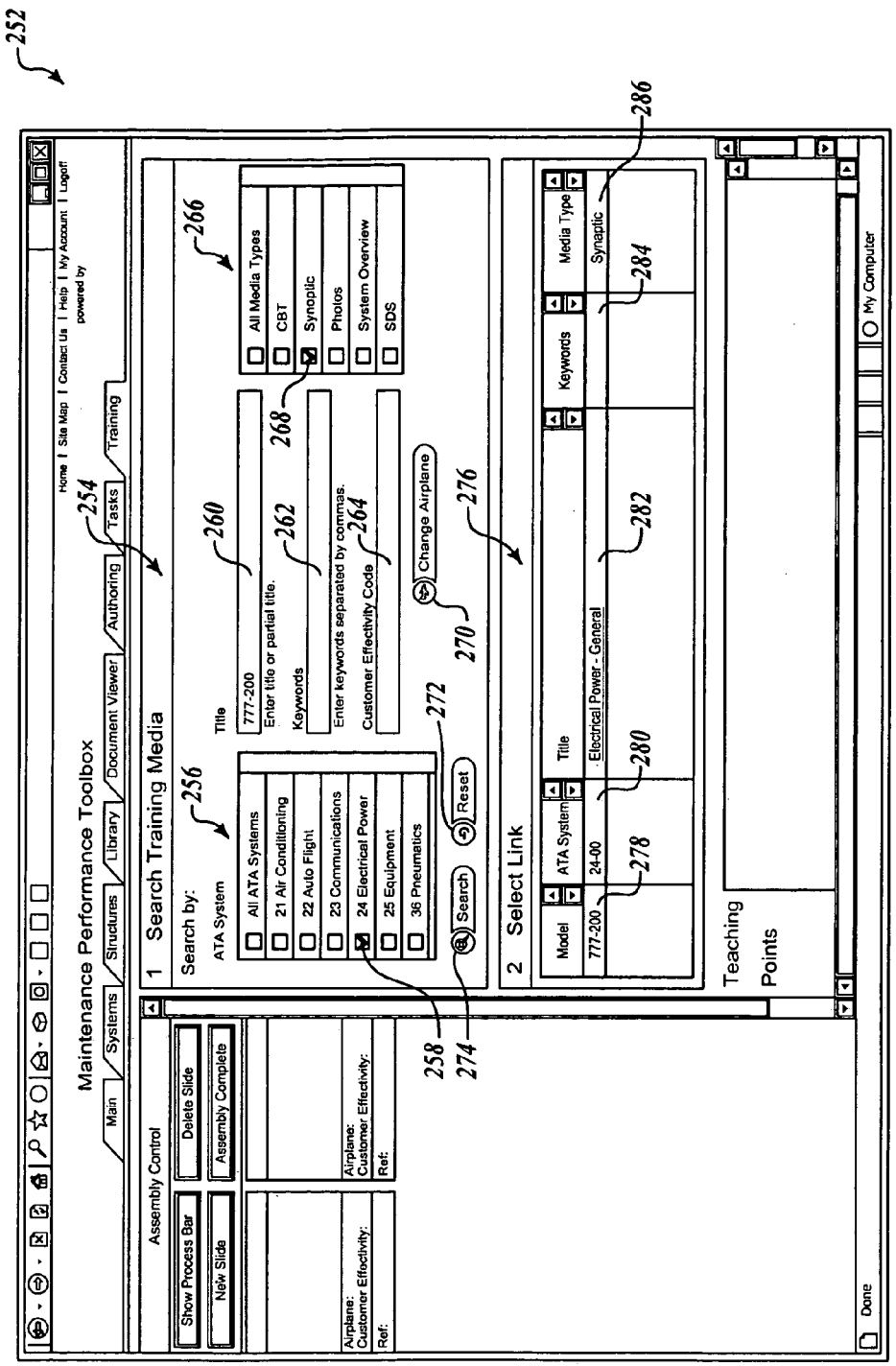

As yet another example of an exemplary manner of searching for course content, a button 250 can be clicked to search media in the repositories 46 and/or 58. Referring now to FIG. 12, a screen 252 is presented in response to clicking the button 250 (FIG. 11). A "Search Training Media" window 254 allows a course developer to search in a box 256 for media that has been categorized according to a system hierarchy. The box 256 suitably may reflect industry categorization of a system. Given by way of non-limiting example, the box 256 sets forth a hierarchical breakdown of systems according to chapters of an Air Transport Association (ATA) System category scheme. As shown in FIG. 12, a box 258 has been checked to enable searching for media categorized according to ATA Chapter 24—Electrical Power. In other embodiments, other hierarchical categorizations that may be used include the Army-Navy "AN" scheme of designating systems (for example AN/URT for radio transmitting set, AN/BQQ for submarine sonar system, AN/SPS for radar set, and the like). Alternately, a course developer can enter a title or partial title of media in a field 260, a keyword in a field 262, or a customer effectivity code in a field 264. In a box 266, a course developer can select which type(s) of media should be included in a search. For example, a course developer has clicked in a box 268 to limit a search to Synoptics media. A button 270 can be clicked to change an airplane model and a button 272 can be clicked to reset search parameters entered in the window 254. A button 274 is clicked to commence the search according to the parameters entered in the window 254.

Search results are returned in a window 276. Each search result is identified by applicable airplane model in a field 278, ATA system in a field 280, title in a field 282, keywords in a field 284, and media type in a field 286. The title entered in the field 282 serves as a link to the media in its applicable repository 48, 50, 52, 54, or 62. As such, the entry in the field 282 may indicate presence of a link by any suitable means, such as use of an underline (as shown), or by use of a different color for text, or the like. The link in the field 282 to the selected media is followed by clicking on the entry for the desired media in the field 282.

Figure 13:
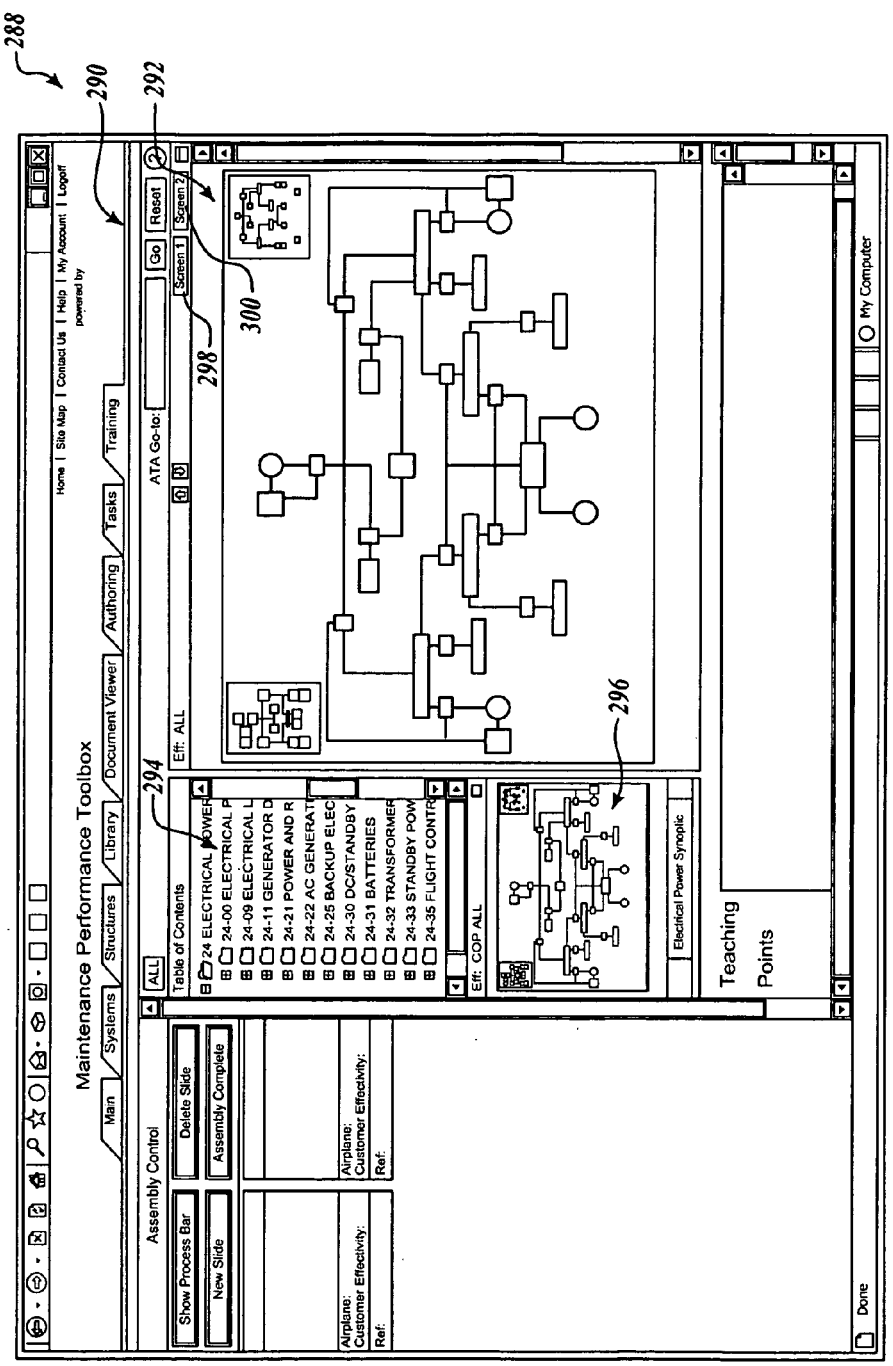

Referring now to FIG. 13, a screen 288 is presented in response to clicking the link in the field 282 (FIG. 12). The screen 288 includes a document viewer 290. The document viewer 290 includes a main viewing window 292, a table of contents viewing window 294, and a thumbnail image viewing window 296. Any of the windows 294, 296, or 298 can be maximized to occupy the entirety of the document viewer 290, if desired. One exemplary document viewer that is well-suited for use as the document viewer is described in U.S. Pat. No. 7,069,261 for "System, Method, and Computer Program Product for Accessing Electronic Information" to Ahl et al. and assigned to The Boeing Company, the entire contents of which are hereby incorporated by reference. However, the document viewer 290 suitably is any acceptable, computer-executable document viewer. Given by way of non-limiting examples and without limitation, the document viewer 290 may include such viewers as Adobe Acrobat Reader, Microsoft PowerPoint, Microsoft Word, or the like.

The main viewing window 292 displays an image generated from the media (resident in one of the repositories 48, 50, 52, 54, or 62) that is pointed to by the link in the field 282 (FIG. 12). As shown in FIG. 13, in this non-limiting example the main viewing window 292 shows an image of a Synoptics diagram for electrical power under ATA chapter 24-00. To link media whose image is shown in the main viewing window 292 to the main screen 18, a course developer clicks on a button 298. To link media whose image is shown in the main viewing window 292 to the detail screen 20, a course developer clicks on a button 300.

The position of the subject matter shown in the main viewing window 292 within a hierarchical category is indicated in the table of contents viewing window. The table of contents viewing window 294 allows the course developer to track where the subject matter of the main viewing window 292 fits in the information hierarchy, thereby maintaining a sense of context.

The image displayed in the main viewing window 292 may be textual content that may include links to other media. If such a link is included, then an image generated from media pointed to by such a link is shown in the thumbnail image viewing window 296. Alternately, when no such link is included (as is the case shown in FIG. 13), then the thumbnail image viewer 296 may show a thumbnail image of the image shown in the main viewing window 292 (as is the case shown in FIG. 13) or may be blank, as desired.

Figure 14:
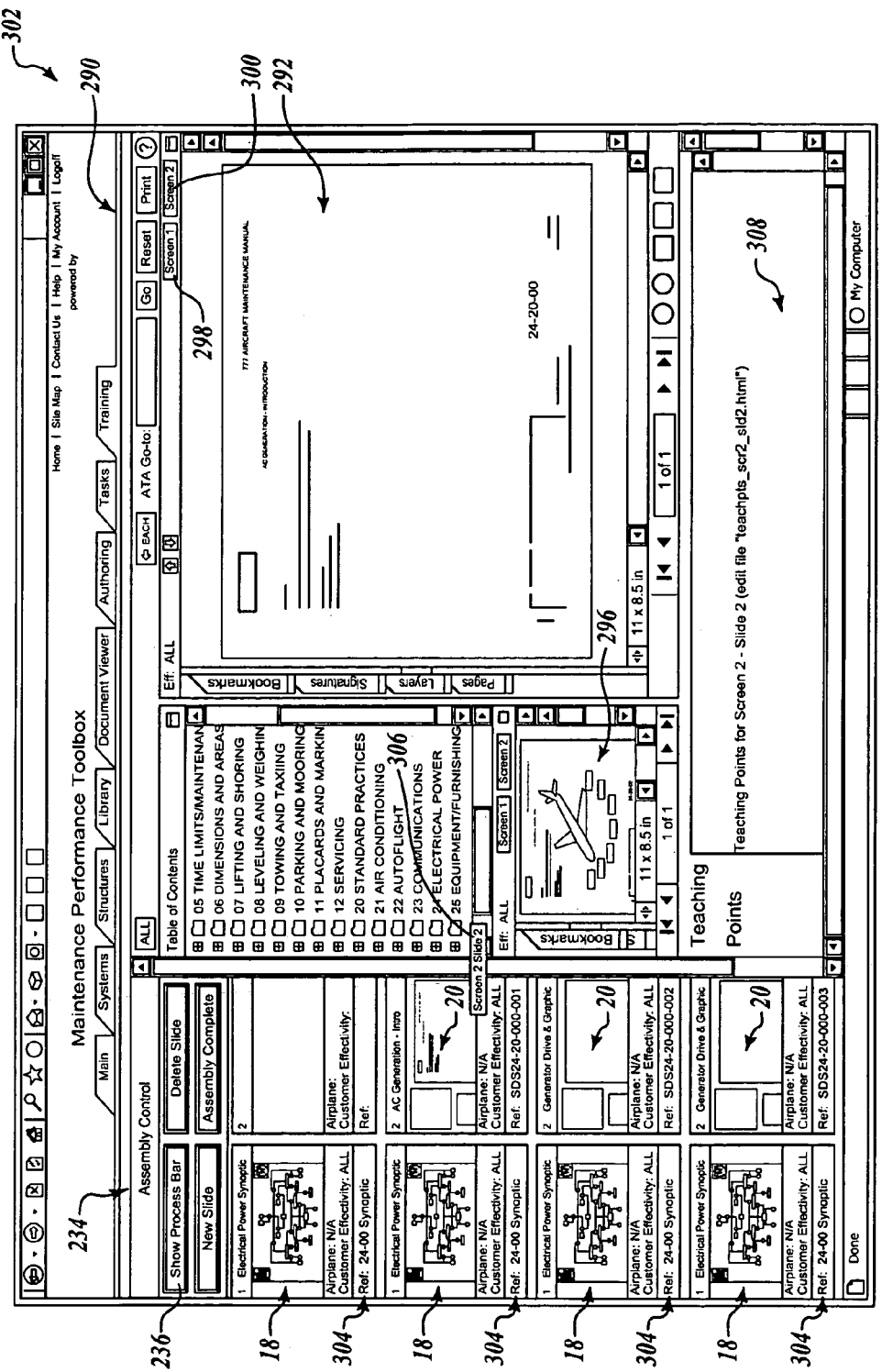

Referring now to FIG. 14, a screen 302 shows in the document viewer 290 one slide that is part of an in-progress training course that includes several slides, most of which include a main screen 18 and a detail screen 20. The main screens 18 and the detail screens 20 (when present) each show a reference line 304 that serves as a link to media used to generate the image in the screen. A progress bar 3046 indicates that the image currently displayed in the main viewing window 292 is the detail screen 20 of the second slide 16 (screen 2 slide 2) of the training course 10 being created. Also, in this non-limiting example a link in the document in the main viewing window 292 has been included, and an image generated by media linked thereto is displayed in the thumbnail image viewing window 296. Teaching points have been added in a window 308. When all of the slides have been created, the button 242 is clicked. After the button 242 is clicked to indicate that creation of the training course is complete, the course developer is presented again with the screen 180 (FIG. 9) in order to save the training course 10 in the internal training course repository 56 or the external training course repository 64, as appropriate.

Course Delivery

Referring back to FIG. 6, an instructor clicks on the tab 162 to access a training function. Referring back to FIG. 7, an instructor clicks on the button 168 to access instructor tools. Referring back to FIG. 8, an instructor enters a model as described above and clicks on the button 178. Referring back to FIG. 10, an instructor clicks on one of the folders 184 that contains the training course to be presented. The instructor selects the training course to be presented by clicking in any of the fields 212, 214, or 216 for the desired training course. The instructor then clicks on the button 228 to access the course delivery function 40.

Figure 15:
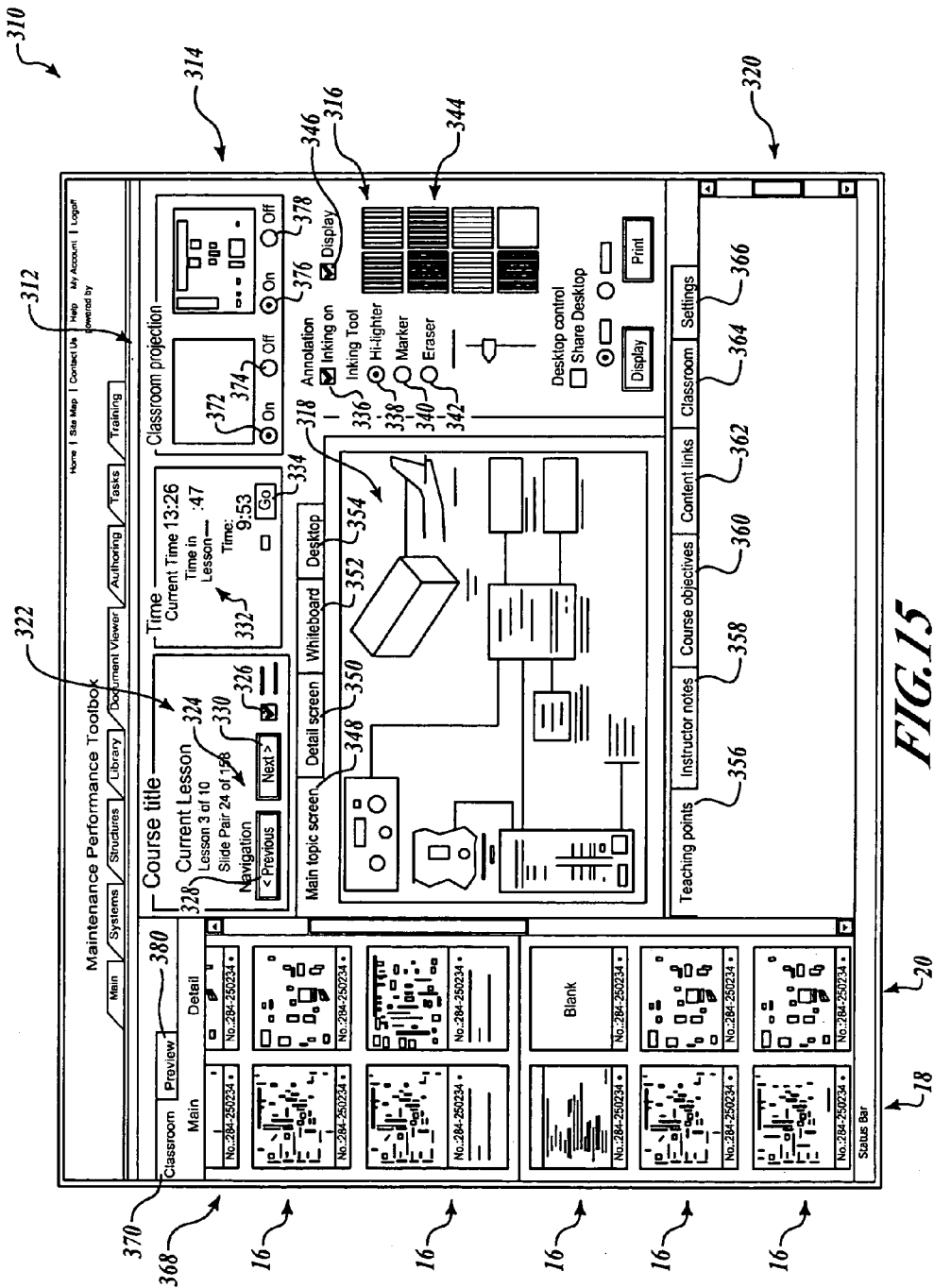

Referring now to FIG. 15, a screen 310 is presented in response to clicking the button 228 (FIG. 10). The screen 310 is viewable by an instructor but is not viewable by any students. A window 312 presents an instructor with information and tools that may be used by the instructor when presenting a training course. The window 312 includes a status and navigation section 314, an annotation section 316, a viewing section 318, and an information section 320.

The status and navigation section 314 includes a status box 322 that presents to an instructor the title of the training course 10, the current lesson 14 being presented, which lesson 14 of the total number of lessons 14 in the training course 10 is being presented, and which slide 16 of the total number of slides 16 in the lesson 14 is being presented.

A navigation bar 324 within the status and navigation section 314 permits an instructor to navigate through the slides 16 and/or the screens 18 and 20 as desired. A "paired advance" box 326 is clicked to navigate via the slides 16 (that is, a pairing of a main screen 18 and a detail screen 20). Alternately, the box 326 is left un-clicked to navigate by way of individual (that is, unpaired) screens 18 and 20. A button 328 is clicked to advance to a next slide 16 or screen 18 or 20, and a button 330 is clicked to return to a previous slide 16 or screen 81 or 20, as desired.

A timing information box 332 within the status and navigation section 314 keeps an instructor apprised of current time of day, time allotted for a lesson 14, and time that has elapsed during presentation of the lesson 14. The elapsed time begins counting when an instructor clicks on a button 334.

In the annotation section 316, clicking in a box 336 activates an inking tool. The inking tool includes a hi-lighter, a marker, and an eraser. A button 338 is clicked on to activate the hi-lighter. A button 340 is clicked on to activate the marker. A button 342 is clicked on to activate the eraser. An individual color box within a color palette 344 is clicked on to select a color as desired for the hi-lighter or the marker. After selecting an inking tool and a color (if the hi-lighter or marker is selected), an instructor places an insertion point of a pointing device, such as a mouse or a track ball or the like, on an image in the viewing section 318 and then clicks and drags to make annotations as desired. When the instructor desires to display the annotations to students, the instructor clicks in a box 346. If the box 346 is clicked while the annotations are being made, then the annotations will be viewable by the student(s) as the annotations are being made.

In the viewing section 318, an instructor clicks on a tab 348 to place in the viewing section 318 an image of the main screen 18 of the current slide 16. A tab 350 is clicked on to place in the viewing section 318 an image of the detail screen 18 of the current slide 16. Other images can be placed in the viewing section 318, if desired. For example, a tab 352 may be clicked on to place in the viewing section 318 an image from an external source, such as without limitation a whiteboard with electronic image capabilities. As a further example, a tab 354 may be clicked on to place in the viewing section 318 an image of a desktop of a computer.

The information section 320 can display various information to an instructor. The following examples are given without limitation by way of non-limiting examples. A tab 356 is clicked on to view teaching points for the current slide 16 or screen 18 or 20. A tab 358 is clicked on to add and/or view instructor notes. A tab 360 is clicked on to view course objectives. A tab 362 is clicked on to view links to the course content 22. A tab 364 is clicked on to view classroom response. A tab 366 is clicked on to view presentation settings.

A student screen section 368 includes thumbnail images of the main screens 18 and the detail screens 20 (when present) of the slides 16 arranged in a matrix of rows and columns. A tab 370 is clicked on to display the screens 18 and 20 that are being viewed by students. The screens 18 and 20 of the current slide 16 are noted in a manner as desired, such as being outlined in a heavy border or the like. Within the status and navigation section 314, an instructor can click on a button 372 to turn on an image of the main screen 18 of the current slide 16 for projection in a classroom. An instructor can click on a button 374 to turn off an image of the main screen 18 of the current slide 16 from being projected in a classroom. An instructor can click on a button 376 to turn on an image of the detail screen 20 of the current slide 16 for projection in a classroom. An instructor can click on a button 378 to turn off an image of the detail screen 20 of the current slide 16 from being projected in a classroom.

An instructor can also preview the screens 18 and 20 of upcoming slides 16 by clicking on a tab 380. When the tab 380 is clicked, the instructor can click on the buttons 372, 374, 376, and 378 to select (or de-select) main screens 18 and detail screens 20 for (or from) projection in the classroom, as desired. Thus, when the instructor navigates through the slides 16 or the screens 18 or 20 using the "previous" button 328 or the "next" button 330, any of the screens 18 or 20 that have been "de-selected" via the buttons 374 or 378, respectively, will be skipped.

Exemplary System Environment

Figure 16:
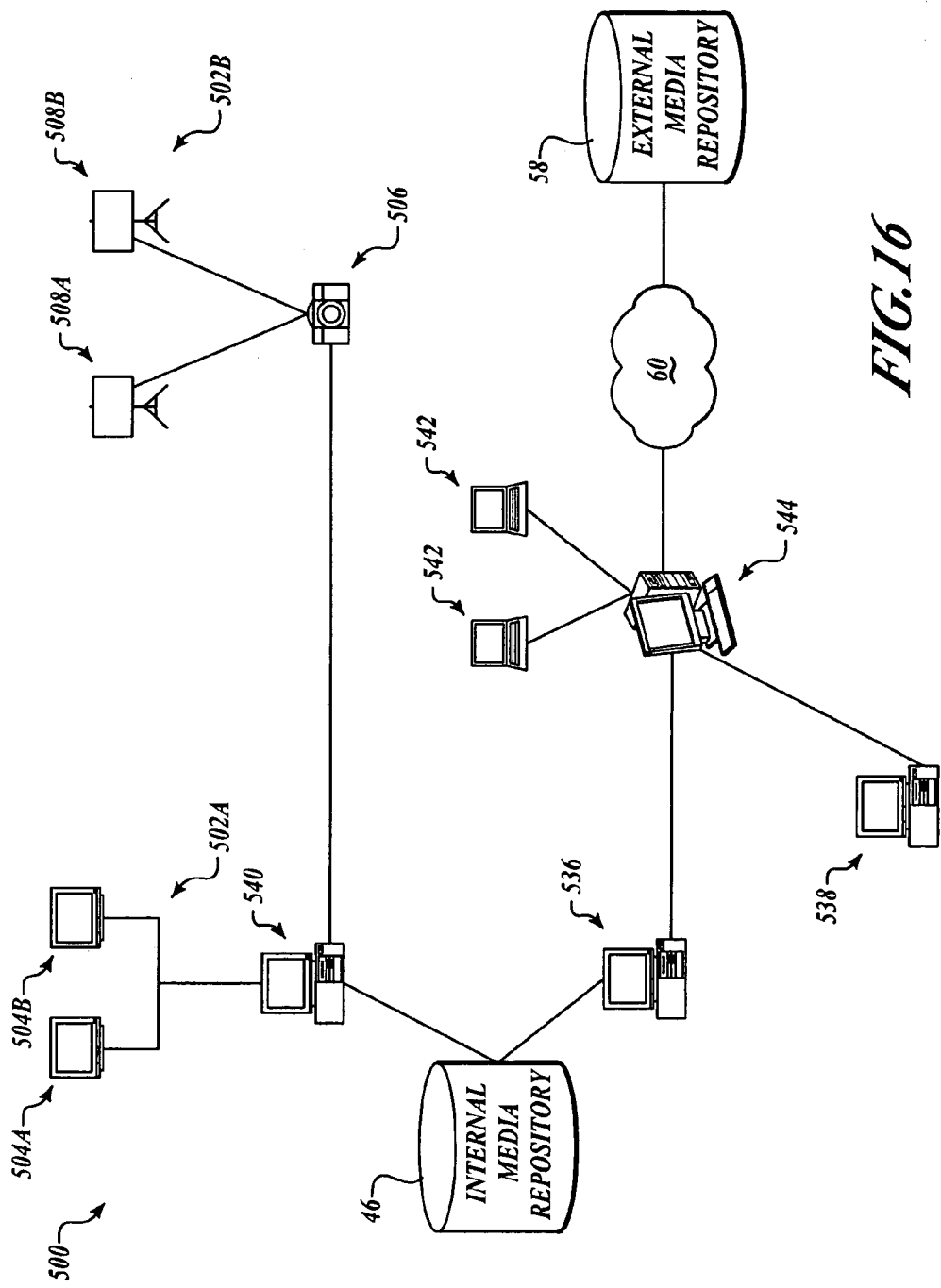
FIG. 16 is a block diagram of an exemplary system environment for hosting the functionality of FIG. 2.

Referring now to FIGS. 1, 2, and 16, an exemplary system environment 500 suitably may host the exemplary functionality described above for developing the training course 10, for delivering the training course 10, and/or for developing and delivering the training course 10. Reference numbers used in reference to components of the system environment 500 are similar to reference numbers used in reference to corresponding functionality shown in FIG. 2.

The course development function 36 is executed by a processing component 536, the course workflow function 38 is executed by a processing component 538, the course delivery function 40 is executed by a processing component 540, student functionality 42 is executed by a processing component(s) 542, and the course administration function 44 is executed by a processing component 544. The processing components 536 and 540 can access media in the internal media repository 46 to accommodate the course development function 36 and the course delivery function 40, respectively, as discussed above. The processing components 536 and 540 can also access media in the external media repository 58 via the network 60, with appropriate permissions from the processing component 544, to accommodate the course development function 36 and the course delivery function 40, respectively, as discussed above.

While the system environment 500 as shown in FIG. 16 illustrates a distributed computing environment, processing within the system environment 500 may be distributed as shown or may be centralized within one processor or may be distributed among as many processors as desired. Thus, hosting the functionality shown in FIG. 2 and described herein is not to be construed as being limited to the exemplary, non-limiting embodiment of the system environment shown in FIG. 16.

In one exemplary embodiment, a display subsystem 502A includes monitors 504A and 504B. The monitors 504A and 504B are driven by the processing component 540. The monitor 504A displays the main screen 18 for viewing by students. The monitor 504B displays the detail screen 20 for viewing by students.

In another exemplary embodiment, a display subsystem 502B includes a projector 506 and projection screens 508A and 508B. The projector 506 is driven by the processing component 540. The projector 506 projects an image of the main screen 18 onto the projection screen 508A for viewing by students. The projector 506 projects an image of the detail screen 20 onto the projection screen 508B for viewing by students. The projector 506 may be a single projector that can project more than one image at a time or the projector 506 may include two projects, as desired.

In various embodiments, portions of the system and method include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing components depicted in FIG. 16.

In this regard, FIGS. 2-16 are block diagrams, flowcharts and control flow illustrations, and screen shots of methods, systems and program products according various embodiments. It will be understood that each block of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s).

Accordingly, blocks of the block diagram, flowchart or control flow illustrations support combinations of means for performing the specified functions, combinations of steps for performing the specified functions and program instruction means for performing the specified functions. It will also be understood that each block of the block diagram, flowchart or control flow illustrations, and combinations of blocks in the block diagram, flowchart or control flow illustrations, can be implemented by special purpose hardware-based computer systems which perform the specified functions or steps, or combinations of special purpose hardware and computer instructions.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A system for developing and delivering a training course, the system comprising:
   a course development subsystem including:
      an electronic media repository to store media items; and
      a first processing component configured to create a plurality of slides related to a particular system, wherein each of the plurality of slides is related to at least one configuration of the particular system, wherein a first slide of the plurality of slides includes a link to a first media item in the electronic media repository, wherein the first media item relates to a particular system of a plurality of configurations of the particular system, and wherein the first slide includes a first presentee screen and a presenter screen;
   a course packaging system including:
      a first user interface configured to receive a selection designating that a training course related to the particular configuration of the particular system is to be presented; and
      a media repository interface configured to:
         use the link included in the first slide to retrieve a most current version of the first media item from the electronic media repository in response to the first slide being accessed during presentation of the training course while online with the electronic media repository via a network, wherein, when the first media item has been updated in the electronic media repository between a time that the first slide was created and when the first media item is retrieved, the most current version of the first media item is automatically inserted into the first slide; and
         use the link included in the first slide to retrieve the most current version of the first media item from the electronic media repository and to store the most current version of the first media item in offline storage when the training course is being prepared to be presented offline from the electronic media repository; and
   a course delivery subsystem including:
      a first display subsystem;
      a second display subsystem;
      a second processing component configured to generate one or more images for display to a presenter by the first display subsystem, wherein the one or more images include the first slide; and
      a third processing component configured to generate an image of the first presentee screen for display to a presentee by the second display subsystem, wherein the presentee screen is displayed to the presentee and the presenter screen is not displayed to the presentee.

2. The system of claim 1, wherein the electronic media repository includes at least one of a production electronic media repository, an operations electronic media repository, and a maintenance electronic media repository.

3. The system of claim 1, further comprising a fourth processing component configured to insert the link to the first media item in the electronic media repository in the first slide.

4. The system of claim 1, wherein each slide of the plurality of slides includes at least a first screen.

5. The system of claim 4, wherein at least one slide of the plurality of slides includes a second screen.

6. The system of claim 1, further comprising a fifth processing component configured to create ad-hoc content from electronic media selected from a source other than the electronic media repository for at least one slide of the plurality of slides.

7. The system of claim 6, further comprising a sixth processing component configured to add teaching points to at least one slide of the plurality of slides.

8. The system of claim 7, further comprising a seventh processing component configured to select less than all slides of the plurality of slides for presentation.

9. The system of claim 1, further comprising a first computer network interface configured to access the electronic media repository within an organization's computer network.

10. The system of claim 9, further comprising a second computer network interface configured to access the electronic media repository over a public computer network.

11. The system of claim 1, further comprising a second user interface configured to define course parameters of the training course.

12. The system of claim 11, wherein the second user interface is configured to permit selecting a number of screens includable in each slide of the plurality of slides.

13. The system of claim 11, further comprising a third user interface configured to add instructor notes to at least one slide of the plurality of slides.

14. The system of claim 13, further comprising a fourth user interface configured to mark up at least one slide of the plurality of slides.

15. The system of claim 14, wherein the fourth user interface is configured to mark up the at least one slide while the first presentee screen is being displayed to the presentee.

16. The system of claim 14, wherein the fourth user interface is configured to mark up the at least one slide while the first processing component is creating the at least one slide.

17. The system of claim 1, wherein at least one slide of the plurality of slides includes a second presentee screen.

18. The system of claim 17, wherein the second processing component is further configured to generate an image of the second presentee screen for display by the second display subsystem to the presentee without displaying the presenter screen to the presentee.

19. The system of claim 18, wherein the second display subsystem includes first and second monitors driven by the second processing component.

20. The system of claim 18, wherein the second display subsystem includes:
first and second projection screens; and
a projection subsystem configured to project images of the first presentee screen and the second presentee screen onto the first and second projection screens, respectively.

21. The system of claim 1, wherein the plurality of slides includes an updated slide that describes an update to the particular configuration.

22. The system of claim 1, wherein the particular system includes at least one aspect of an aircraft, wherein the selection of the particular configuration is provided to the course packaging system by one of the presenter and the presentee providing a tail number of a particular aircraft of interest via the first user interface of the course packaging system.

23. A non-transitory computer-readable storage medium storing instructions executable by a computing system to develop and deliver a training course on a particular system, the computer-readable storage medium storing instructions comprising:
a first computer program code module to develop a training course, the first computer program code module including:
first computer program code means to access an electronic media repository via a computer network, wherein the electronic media repository stores a plurality of media items; and
second computer program code means to create one or more slides using media items from the electronic media repository, wherein a first slide of the one or more slides includes a link to a first media item related to a particular configuration of a particular system of the training course, wherein the first slide includes a presenter screen and a presentee screen; and
a second computer program code module to deliver the training course, the second computer program code module including:
third computer program code means to access the electronic media repository to generate an instance of the training course that is related to the particular configuration of the particular system that is applicable to a presentee, wherein the third computer program code means is configured to:
use the link included in the first slide to retrieve a most current version of the first media item in response to the first slide being accessed during presentation of the training course while online with the electronic media repository,
wherein, when the first media item has been updated in the electronic media repository between a time when the first slide was created and when the first media item is retrieved, the most current version of the first media item is automatically inserted into the first slide; and
use the link included in the first slide to retrieve the most current version of the first media item from the electronic media repository and store the most current version of the first media item in offline storage when the training course is being prepared to be presented offline from the electronic media repository;
fourth computer program code means to display to a presenter the presenter screen of the first slide; and
fifth computer program code means to display to the presentee the presentee screen of the first slide, wherein the presentee screen is displayed to the presentee and the presenter screen is not displayed to the presentee.

24. The non-transitory computer-readable storage medium of claim 23, wherein the one or more slides are stored in a training electronic media repository.

25. The non-transitory computer-readable storage medium of claim 23, wherein the particular system concerns one of installation, operation, or maintenance of a particular vehicle or of a particular apparatus installed in the particular vehicle.

26. The non-transitory computer-readable storage medium of claim 23, wherein the second computer program code means is further configured to create an updated slide that describes an update to the particular configuration.

27. A non-transitory computer-readable storage medium storing instructions executable by a computer system to develop and deliver a training course related to a particular system, the computer-readable storage medium storing instructions comprising:
course development instructions executable by the computer system to:
access an electronic media repository storing media items relating to the particular system;

enable creation of a course template for the particular system, wherein the course template receives one or more slides that relate to a particular configuration of the particular system; and enable creation of the one or more slides relating to the particular configuration, wherein a first slide of the one or more slides includes a link to a first media item that is related to the particular configuration, and wherein the first slide includes a presenter screen and a presentee screen; and course delivery instructions executable by the computer system to:

identify that the particular configuration is applicable to a presentee;

access the electronic media repository to retrieve the course template and the one or more slides relating to the particular configuration of the particular system; and:

use the link included in the first slide to retrieve a most current version of the first media item from the electronic media repository in response to the first slide being accessed during presentation of the training course while online with the electronic media repository, wherein, when the first media item has been updated in the electronic media repository between a time that the first slide was created and when the first media item is retrieved, the most current version of the first media item is automatically inserted into the first slide; and use the link included in the first slide to retrieve the most current version of the first media item from the electronic media repository and to store the most current version of the first media item in offline storage when the training course is being prepared to be presented offline from the electronic media repository;

present the presenter screen of the first slide to a presenter; and present the presentee screen of the first slide to the presentee and the presenter screen is not presented to the presentee.

28. The non-transitory computer-readable storage medium of claim 27, wherein the course development instructions make the one or more slides available to the course delivery instructions when the one or more slides have been approved.

29. The non-transitory computer-readable storage medium of claim 27, wherein the course development instructions insert an additional link to additional electronic media in the one or more slides.

30. The non-transitory computer-readable storage medium of claim 29, wherein the course delivery instructions use the additional link to access the additional electronic media referenced by the additional link when the training course is being prepared to be presented offline from the electronic media repository.

31. The non-transitory computer-readable storage medium of claim 27, wherein the particular system concerns one of installation, operation, or maintenance of a particular vehicle or of a particular apparatus installed in the particular vehicle.

32. The non-transitory computer-readable storage medium of claim 31, wherein the course development instructions enable creation of an updated slide that describes an update to the particular configuration.

\* \* \* \* \*